United States Patent [19]

Iwase et al.

[11] Patent Number: 4,791,678
[45] Date of Patent: Dec. 13, 1988

[54] IMAGE PROCESSING SYSTEM

[75] Inventors: Hiromichi Iwase, Kawasaki; Shigeru Sasaki, Yokohama; Toshiyuki Gotoh, Tokyo; Takashi Toriu; Tohru Ozaki, both of Kawasaki, all of Japan

[73] Assignee: Fujitsu Limited, Kangawa, Japan

[21] Appl. No.: 161,274

[22] Filed: Feb. 22, 1988

Related U.S. Application Data

[63] Continuation of Ser. No. 722,940, Apr. 12, 1985, abandoned.

[30] Foreign Application Priority Data

Apr. 13, 1984 [JP] Japan .................................. 59-74443

[51] Int. Cl.$^4$ ............................................. G06K 9/40
[52] U.S. Cl. ..................................... 382/54; 358/284; 382/50; 382/51
[58] Field of Search ....................... 382/50, 51, 52, 53, 382/54, 55, 18; 358/163, 282, 284

[56] References Cited

U.S. PATENT DOCUMENTS

| | | | |
|---|---|---|---|
| 4,003,024 | 1/1977 | Rigonati et al. | 382/54 |
| 4,354,243 | 10/1982 | Ryan et al. | 382/54 |
| 4,360,883 | 11/1982 | Ejiri et al. | 382/50 |
| 4,466,123 | 8/1984 | Arai et al. | 382/55 |
| 4,467,364 | 8/1984 | Konagaya | 358/284 |
| 4,472,736 | 9/1984 | Ushio et al. | 382/50 |
| 4,633,314 | 12/1986 | Kurata et al. | 358/284 |

OTHER PUBLICATIONS

IBM Journal Research and Development, vol. 27, No. 4, Jul. 1983, pp. 400-410, Armonk, New York, US; J. M. White et al.

Pergamon Press 1968, vol. 1, pp. 33-61 Great Britain "Distance functions on Digital Pictures" by A. Rosenfeld, J. L. Pfaltz.

Electronics Science Series, vol. 84, pp. 59-77 Japan, "Computer Image Processing" by T. Aguin and M. Nakazima.

*Primary Examiner*—Leo H. Boudreau
*Assistant Examiner*—Joseph Mancuso
*Attorney, Agent, or Firm*—Armstrong, Nikaido, Marmelstein & Kubovcik

[57] ABSTRACT

An image processing system mainly used in an image verification system for detecting and correcting distortion of an input image includes the following devices; an image memory for storing a digitized image before, during, and after correction, a working memory for temporarily storing intermediate data of the image on correction, density level extension devices for extending the density level or gradation of the image by repeatedly reading out the contents of the image memory and the working memory by using a matrix window containing picture elements of the image, a density slope detection device for detecting the extended density level and calculating a density slope or gradient by using the matrix window, and a correction device for correcting density distribution and line width of the image based on the extended density level and the calculated density slope.

8 Claims, 29 Drawing Sheets

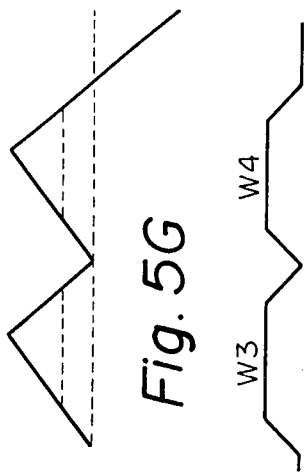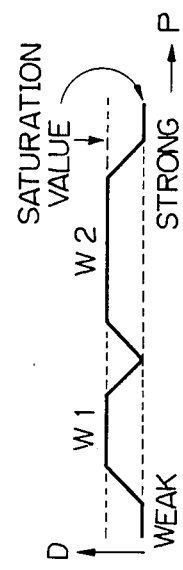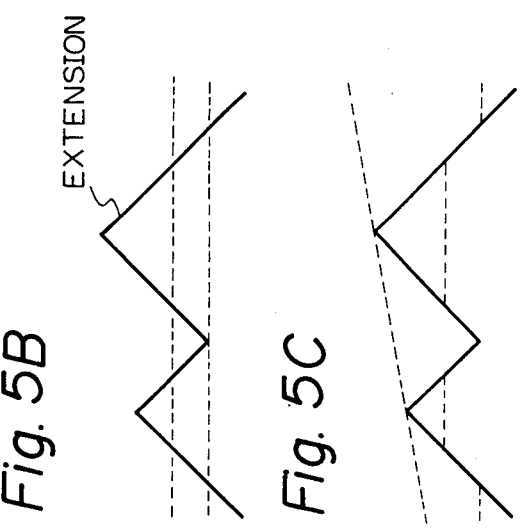

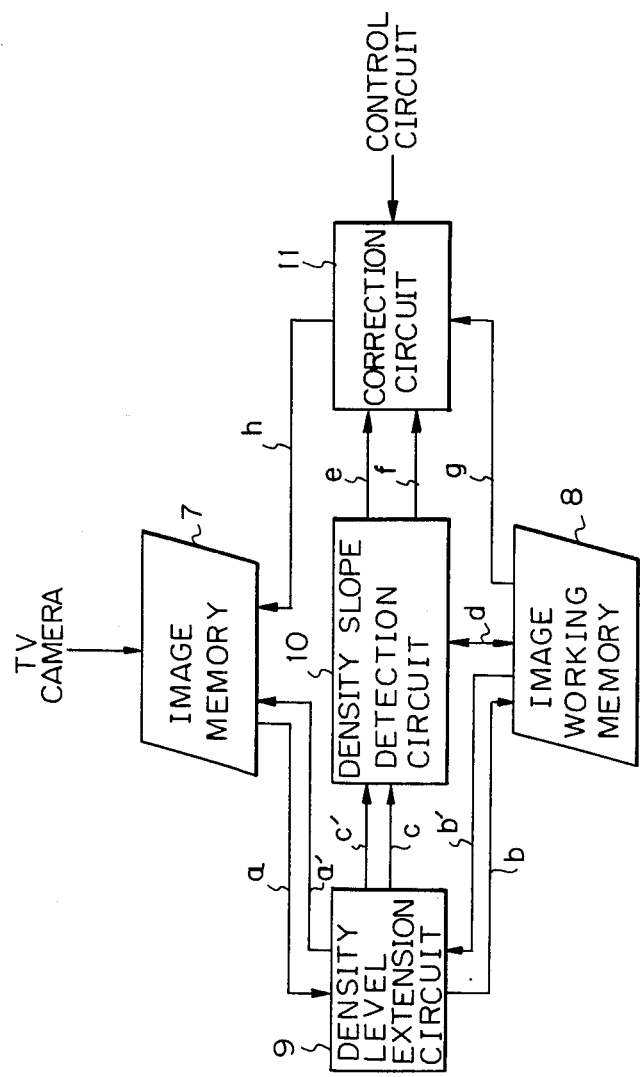

$G_1(x_1, y_1)$ $G_2(x_2, y_2)$ $G_3(x_3, y_3)$ $G_4(x_4, y_4)$

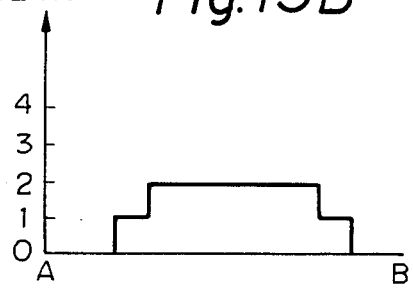

| LU | MU | RU |
|----|----|----|
| LM | MM | RM |
| LD | MD | RD |

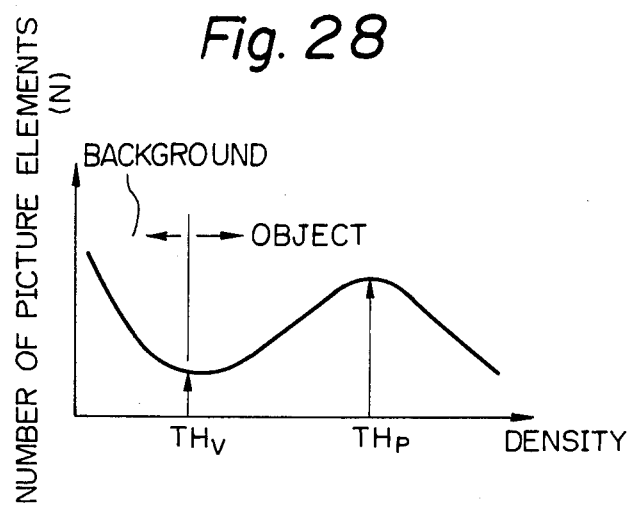
Fig. 28
Fig. 29A  BEFORE REDUCTION
Fig. 29B  AFTER REDUCTION

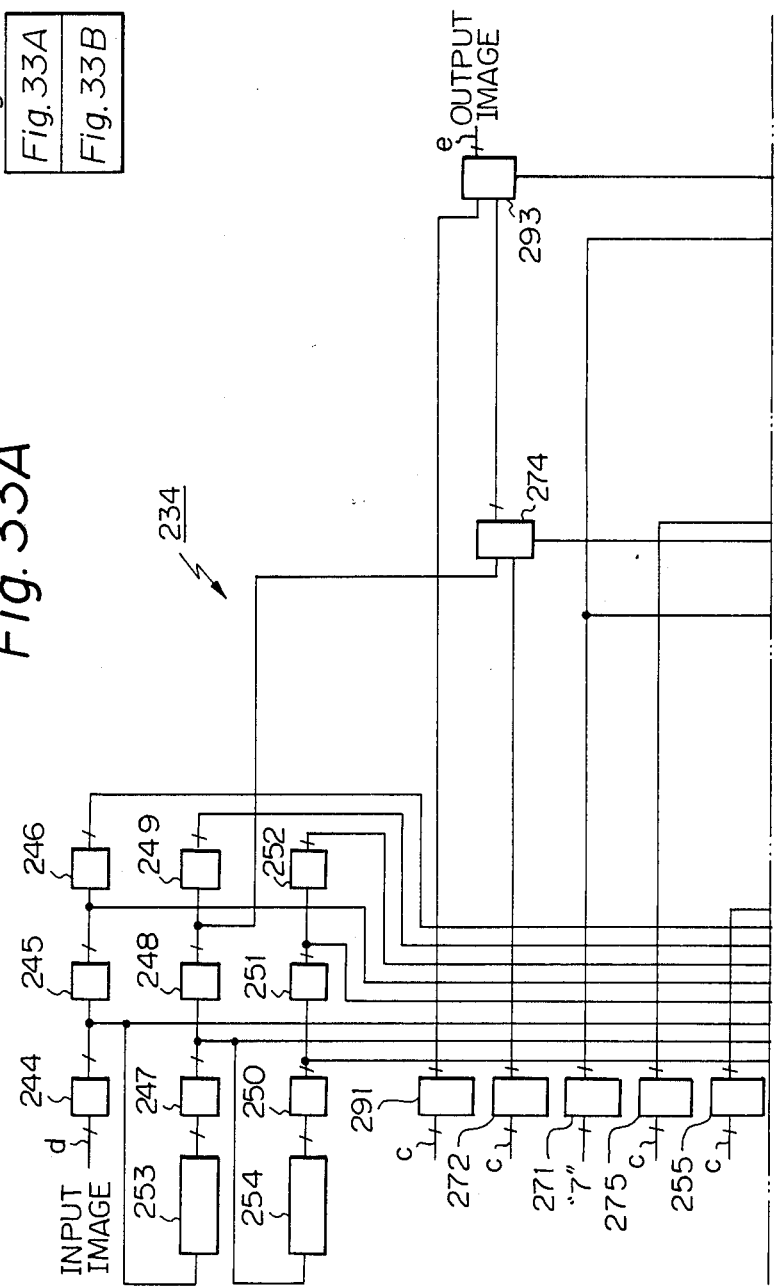

IMAGE PROCESSING SYSTEM

BACKGROUND OF THE INVENTION

1. Field of the Invention

The present invention relates to an image processing system for detecting and correcting distortion of the image, for example, density blur of a pattern and character of a printed character or a seal. The present invention is advantageously used as an image verification system of, for example, a seal or printed character on a document, bankbook, or bank check.

2. Description of the Related Art

In daily life, printed characters and seals are used for many documents, such as certificates, registrations, and notifications.

In such cases, when, for example, a seal is used, "density blur", i.e., blurring, blotting or unevenness, or the reproduction of the seal on the document sometimes occurs due to the condition of the seal. In particular, when a registered seal, for example, is used by a customer to withdraw money from a bank account, verification of a blurred and uneven seal creates a problem for the bank. Therefore, a verification system must be used by the bank in an attempt to precisely verify the authenticity of the seal.

Conventionally, there is provided an image processing method for detecting and correcting distortion (density blur and the like) of the input image, in which distortion of the input image is detected and corrected in an input apparatus of the system having a known electrical characteristic. The input apparatus comprises a correction table (memory) for each picture element of the input image.

This correction table stores a predetermined value per each picture element for correcting the input image so to obtain a uniform characteristic of the output image. When an image is input to the input apparatus, the input image is compared with the correction table. Then, the predetermined value in the correction table is added to the corresponding picture element, to correct the input image, and a new corrected picture element is obtained from the output of the input apparatus.

This system is effective when the distortion characteristics of the input image are previously known. However, it is difficult to correct distortions, such as density blur, density slope, and nonuniform line width caused by the application of a nonuniform pressure when using a seal, because these distortions occur for a variety of reasons and the correction table of the input apparatus can not follow all the variations of such distortions.

This problem will be explained in detail hereinafter.

SUMMARY OF THE INVENTION

The primary object of the present invention is to provide an image processing system for detecting and correcting distortion of the input image, for example, density blur in a printed character, seal, and the like.

Another object of the present invention is to provide an image verification system using an improved image processing system.

In accordance with the present invention, there is provided an image processing system, used mainly in an image verification system, for detecting and correcting distortion of an input image including: an image memory for storing digitized images before, during, and after correction; a working memory for temporarily storing intermediate data of the image during correction; a density level extension device for extending the density level or gradation of the image by repeatedly reading out the contents of the image memory and the working memory by using a matrix window containing picture elements of the image; a density slope detection device for detecting the extended density level and calculating the density slope or gradient by using the matrix window; and a correction device for correcting the density distribution and line width of the image based on the extended density level and the calculated density slope. There is further provided a method of processing an image by detecting and correcting distortion of the image including the steps of: scanning the image having picture elements by using the matrix window; extending the density level of the center of the picture element in the matrix window when peripheral density levels of the center of the picture element in the matrix window are larger than a predetermined threshold density level; detecting the density slope or gradient of the image based on the extended density level of the picture element in the matrix window; and correcting the density distribution and line width of the image based on the density level and density slope.

BRIEF DESCRIPTION OF THE DRAWINGS

In the drawings;

FIGS. 5A to 5B are schematic views for explaining the correction of density slope according to the present invention;

FIG. 6 is a schematic block diagram of an image processing system according to an embodiment of the present invention;

FIGS. 13A–G are schematic views for explaining another method of extending the density level according to the present invention;

FIG. 28 is a schematic view of a density histogram;

FIGS. 29A and 29B are schematic views for explaining another reduction of density level;

FIGS. 31, 31A and 31B are another embodiment of the block diagram shown in FIG. 20;

FIGS. 33, 33A and 33B are a detailed block diagram of the density gradation extension circuit shown in FIG. 31;

DESCRIPTION OF THE PREFERRED EMBODIMENTS

Before describing the preferred embodiments, an explanation will be given of the conventional image correction method in which the density slope of the image is presumed from density values of the peripheral portion of an object input image.

Figure 1:
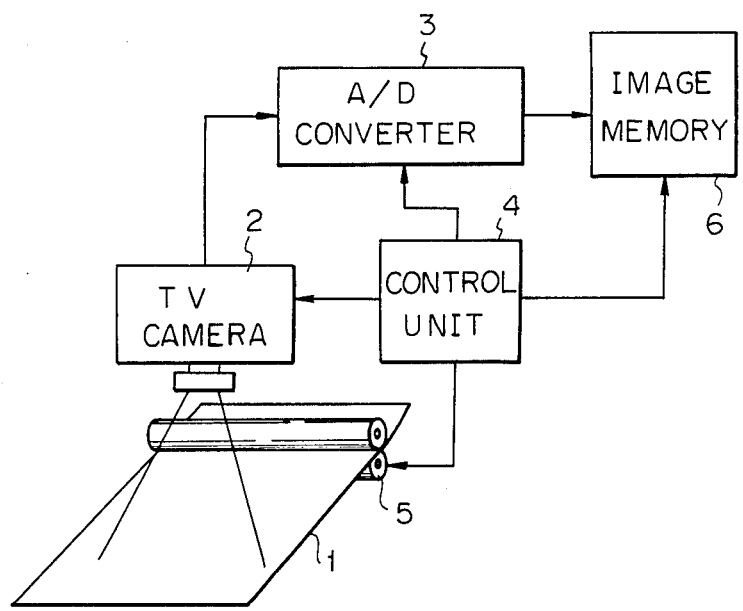
FIG. 1 is a schematic block diagram of an image input system for explaining the concept of image correction.
Figure 2A:
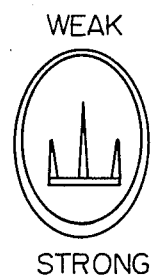
FIGS. 2A and 2B are views of a seal image.
Figure 2B:
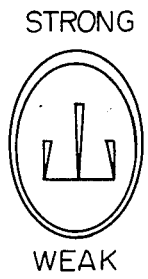

In FIG. 1, reference number 1 represents a document bearing a seal as shown in FIGS. 2A and 2B, reference number 2 represents a television camera (TV camera) having, for example, a charge couppled device (CCD) for reading out the image on the document 1 by using raster scanning, reference number 3 represents an analog-to-digital converter (A/D converter) for converting an analog signal sent from the TV camera 2 to a digital signal, reference number 4 represents a control unit for controlling operations of a roller carriage 5, the TV camera 2, A/D converter 3, and an image memory unit 6. The image memory unit 6 can store the image signal converted to the digital signal by the A/D converter 3 based on commands sent from the control unit 4.

As shown in FIGS. 2A and 2B, density blurs, particularly density slope, occur through pressure variations when using the seal. That is, in FIG. 2A, the upper portion of the seal is under a weak pressure and the lower portion under a strong pressure, as indicated by thin and thick lines. Conversely in FIG. 2B, the upper portion is under a strong pressure and the lower portion under a weak pressure. These images of the seal on the document 1 are detected by the TV camera 2.

Figure 3A:
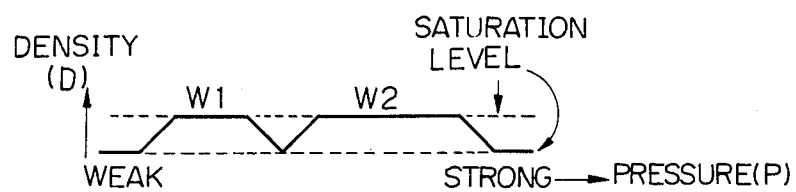
FIGS. 3A to 3E are schematic views for explaining the correction of density slope in a conventional system.

In FIG. 3A, the ordinate represents density level and the abscissa represents the pressure (P) distribution, shown in the longitudinal direction in FIG. 2B, when the seal is used. That is, in the abscissa, the strong force is represented on the right, and the weak force is represented on the left. The upper dotted line represents a pre-determined threshold level for the density level. Therefore, this line also represents the saturation value of the density level.

As clearly shown by the drawing, the line width W1 is narrow at a weak pressure, and the line width W2 is wide at a strong pressure.

Figure 3B:

The ideal line widths of the image to be obtained by correction are shown in FIG. 3B. As can be seen in the drawing, both line widths W3 and W4 are equal for a weak and a strong pressure. That is the density level of the image is uniform in all areas.

Figure 3C:
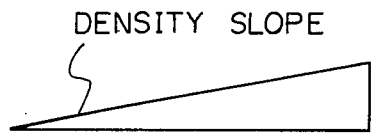
Figure 3D:

In order to obtain the ideal line widths of the image as shown in FIG. 3B, in general, corrections as shown in FIGS. 3C and 3D are added to the image shown in FIG. 3A. In this case, the density slope shown in FIG. 3C is obtained based on average values of the density level shown in FIG. 3A, and then a converse density slope shown in FIG. 3D is obtained from the density slope shown in FIG. 3C. This converse density slope represents the correction density slope. In this case, since the right side is wide, as shown in FIG. 3A, the correction density slope as shown in FIG. 3D is added to the image shown in FIG. 3A, and thus the image shown in FIG. 3E is obtained by this correction.

Figure 3E:
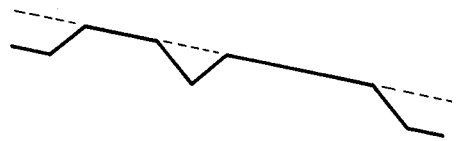

However, as can be seen in FIG. 3E, the ideal density level and line widths as shown in FIG. 3B can not be obtained by this correction.

This is because where the distortion of the input apparatus is large when correcting the image, or the density level is saturated when quantizing, if correction is performed by merely adding the density slope as shown in FIG. 3D, the ideal density level and line widths as shown in FIG. 3B can not be obtained by this correction.

Figure 4A:
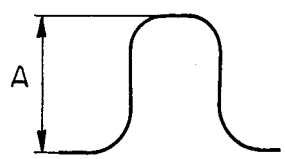
FIGS. 4A to 4G are schematic views for explaining the conversion of an analog signal to four digital signals.
Figure 4B:
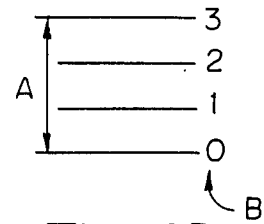
Figure 4C:
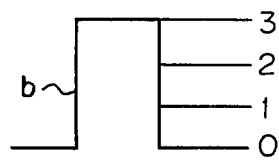
Figure 4D:
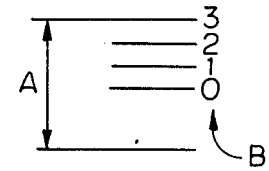
Figure 4E:
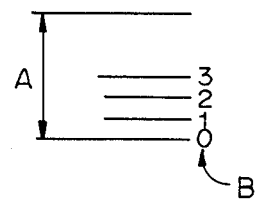
Figure 4F:
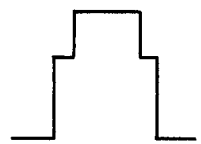
Figure 4G:
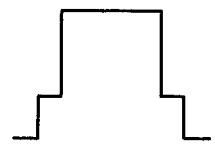

That is, as shown in FIGS. 4A to 4G, the extent of the correction is limited because of the characteristic of the A/D converter 3. Namely, when an analog signal A shown in FIG. 4A indicating the density is divided by four digital signals B as shown in FIG. 4B, the important portions in which there is a considerable change in the density slope can not be obtained from this analog-to-digital conversion because the digitized intervals are too wide. Conversely, when only the important portions are converted to four digital signals B having narrow digitized intervals, as shown in FIGS. 4D and 4E, the density level may be saturated due to the characteristic of the A/D converter 3.

Although a non-linear type A/D converter is known, this non-linear type A/D converter is very expensive and is difficult to use in this system.

As explained above, when too large an analog signal is input to the A/D converter 3, as shown in FIG. 4E (i.e., exceeding a digital value of "3"), all output signals of the A/D converter become a maximum digital value "3". Accordingly, although there are changes in the density level over the digital value "3", the output of the A/D converter 3 indicates only the digital value "3". Consequently, the digital output of the A/D converter 3 does not indicate the precise density level of the input image.

An image processing system according to the present invention will now be explained in detail with reference to the drawings.

FIGS. 5A to 5G, show the procedures needed to obtain the ideal density level and line widths shown in FIG. 5G. FIG. 5A shows the same features as shown in FIG. 3A. In FIG. 5B, the density level is extended by calculating the saturated density level based on "matrix window scanning", for example, n×n matrix window, explained in detail later. The density slope can be obtained by this matrix window scanning as shown by the slanted dotted line in FIG. 5C and by the solid lines in FIG. 5D. The converse correction density slope can be obtained from the density slope as shown in FIG. 5E. The uniformalized density level as shown in FIG. 5F can be obtained by adding the characteristic shown in FIG. 5C to the correction density slope shown in FIG. 5E. The ideal line widths W3 and W4 shown in FIG. 5G can be obtained by cutting the upper portions or peaks of the characteristic based on the predetermined threshold density level.

In FIG. 6, reference number 7 represents an image memory, 8 an image working memory, 9 a density level extension circuit, 10 a density slope detection circuit, and 11 a correction circuit.

The image memory 7 stores images before, during, and after correction.

The image working memory 8 temporarily stores intermediate data of the image during correction.

The density level extension circuit 9 is provided to extend the density level as shown in FIG. 5B. The circuit 9 reads out the contents of the memory 7 through a data line a, and extends the density level. The circuit 9 also outputs this extended data to the working memory 8 through a data line b. Next the circuit 9, reads out the contents of the working memory 8, and extends the density level, then outputs this extended data to the memory 7 through a data line a'. These processing procedures are repeated between the memory 7 and the memory 8 through the circuit 9. That is, when one image is processed, the circuit 9 also reads out the contents of the working memory 8 through the data line b', extends the density level, and outputs the image having a twice extended density level to the memory 7. These procedures are repeated until the density level of the final picture element is extended. When the extension of the density level is completed, the circuit 9 outputs a command to start operation to the density slope detection circuit 10 through a data line C.

The density slope detection circuit 10 reads out the contents of the working memory 8 through a data line d and calculates the density slope. The calculated data is output to the correction circuit 11 through a data line e and is also used to start the operation of the circuit 11 through a data line f.

The correction circuit 11 reads out the contents of the working memory 8 through a data line g and corrects the density level based on the data read out from the circuit 10 through the data line e by adding FIG. 5C to FIG. 5F, and obtains the ideal line widths W3 and W4 as shown in FIG. 5G. The data output by the circuit 11 is then applied to the memory 7.

Figure 7:
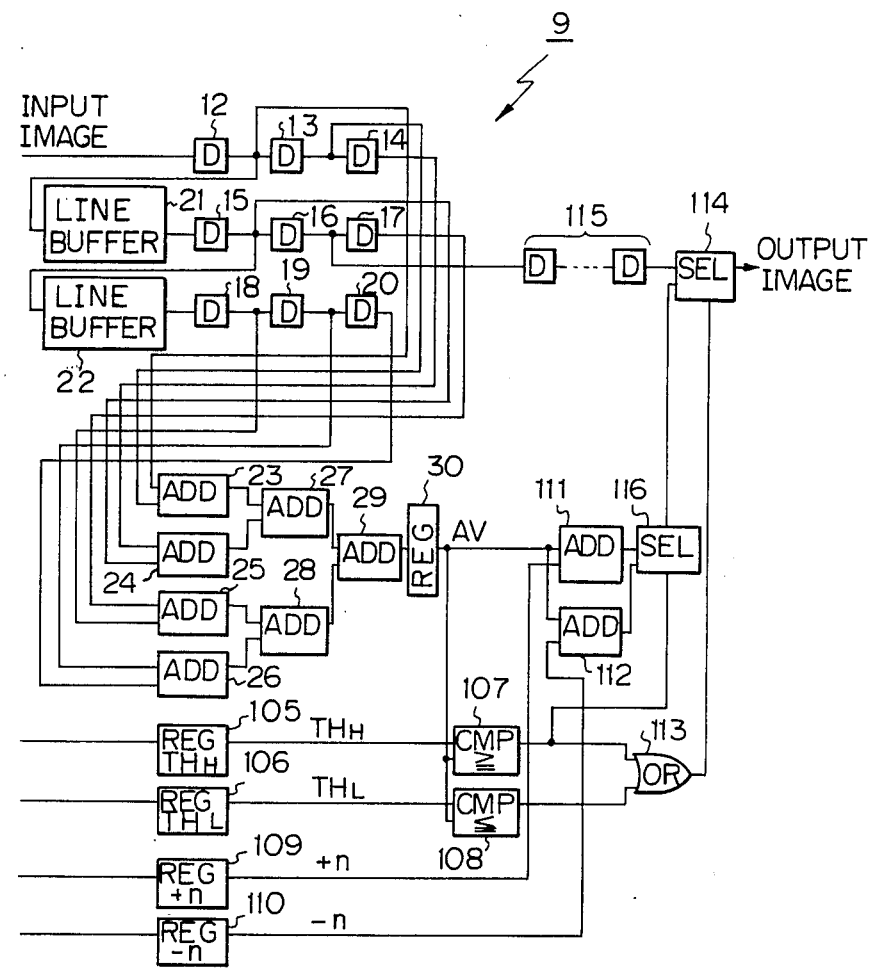
FIG. 7 is a detailed block diagram of the density level extension circuit shown in FIG. 6.

FIG. 7 is a detailed block diagram of the density level extension circuit 9 shown in FIG. 6. In FIG. 7, reference numbers 12 to 20 represent delay circuits, 21 and 22 line buffers, 23 to 29 adders, 30 a shift register, 105 and 106 registers, 107 and 108 comparators, 109 and 110 registers, 111 and 112 adders, 113 an OR circuit, 114 a selector, 115 delay circuits, and 116 a selector.

In the circuit 9, "matrix window scanning", i.e., image scanning by matrix window, is performed in order to obtain an extension of the density level. The matrix window size is, for example, set to n×n matrix window, for example, 3×3, in this embodiment. Delay circuits 12 to 20 and line buffers 21 and 22 are provided in order to perform so-called local parallel processing. Each of the outputs of circuits 12 to 20 corresponds to each of the picture elements in the 3×3 area of the matrix window in the memory 7. For example, the delay circuit 12 represents one picture element.

The adders 23 to 29 add each of the outputs of circuits 12 to 20, i.e., density of the eight peripheral picture elements and excepting the center of the picture element, in the matrix window area of 3×3. Line buffers 21 and 22 are used for processing in parallel each of the input picture elements with a delay of three picture elements in one line. The shift register 30 calculates an average density value AV as a typical future of the eight peripheral picture elements in the matrix windows area of 3×3. This method for obtaining the average value is the first embodiment of the present invention.

The register 105 stores an upper threshold density value $TH_H$ used as an upward extension, and the register 106 stores a lower threshold value $TH_L$ used as a downward extension. When the average value AV is smaller than the threshold value $TH_H$, the comparator 107 outputs "0", and when the AV is larger than $TH_H$, the comparator 107 outputs "1". When the AV is larger than the threshold value $TH_L$, the comparator 108 outputs "0", and when the AV is smaller than $TH_L$, the comparator 108 outputs "1".

The register 109 previously stores the value to be added to the average value AV when the AV is larger than $TH_H$, and the register 110 previously stores the value to be added to the AV when the AV is smaller than $TH_L$. The adder 111 adds the average value AV to data in the register 109 and the adder 112 adds the AV to data in the register 110. The selector 116 outputs the output of the adder 112 to the selector 114 when the output of the comparator 107 is "0", and the selector 116 outputs the output of the adder 111 to the selector 114 when the output of the comparator 107 is "1". The OR circuit 113 outputs the OR logic of the outputs of the comparators 107 and 108.

When the output of the OR circuit 113 is "0", the selector 114 selects the output of the delay circuits 115 (i.e. density value of the input image), and when the output of the circuit 113 is "1", the selector 114 selects the output of the selector 116 and outputs this value. The delay circuits 115 are provided to obtain a proper timing between the output of the delay circuit 16 and the outputs of the adders 111 and 112.

Briefly, the circuit shown in FIG. 7, i.e., the density level extension circuit 9, functions as follows. The optional small 3×3 area having picture elements therein is set to the input image. The average value of the density AV is obtained from the eight peripheral picture elements in the small 3×3 area, and the average value AV is compared with both threshold values $TH_H$ and $TH_L$. The center of the picture element in the small 3×3 area is processed as follows. That is, when the AV is between $TH_H$ and $TH_L$ ($TH_L < AV < TH_H$), the density level of the center of the picture element is maintained at the density level of the input image. When the AV is smaller than or equal to $TH_L$ ($AV \leq TH_L$), the center of the picture element is replaced to the extent of the value subtracted by the predetermined value from the AV. When the AV is larger than or equal to the $TH_H$ ($TH_H \leq AV$), the center of the picture element is replaced to the extent of the value added by the predetermined value to the AV. Thus, the threshold value $TH_H$ is moved upward and the threshold value $TH_L$ is moved downward with every scanning of one image. These procedures for upward and downward extension are repeated until replacement of the center of the picture element is not needed, and thus, an image having the extended density level shown in FIG. 5B is obtained by these repeated procedures.

Figure 8A:
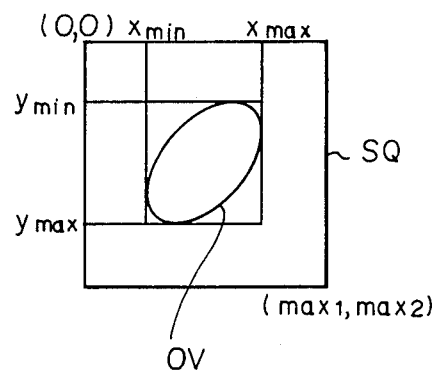
FIGS. 8A to 8E are schematic views for explaining the calculation of the density slope.
Figure 8B:
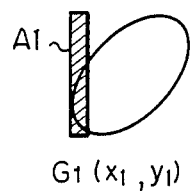
Figure 8C:
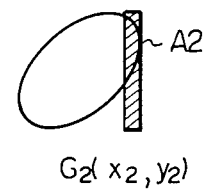
Figure 8D:
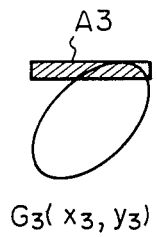
Figure 8E:
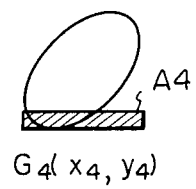

The density slope is obtained by the following procedures. In FIG. 8A, the image area is shown by the square SQ, and an object image, for example, a seal, is shown by an oval OV. The oval OV is set within the boundaries of the ordinates (Xmin, Ymin, Xmax, Ymax). As shown in FIGS. 8B to 8E, the slant line portions show small areas A1, A2, A3, and A4. The picture element having a maximum density level is contained in each of small areas A1 to A4.

The density slope Sx in the X-direction and the density slope Sy in the Y-direction are given by the following formulas:

$$Sx = \frac{(G_2 - G_1)(y_4 - y_3) - (G_4 - G_3)(y_2 - y_1)}{(X_2 - X_1)(Y_4 - Y_3) - (X_4 - X_3)(Y_2 - Y_1)} \quad (1)$$

$$Sy = \frac{(G_2 - G_1)(x_4 - x_3) - (G_4 - G_3)(x_2 - x_1)}{(y_2 - y_1)(x_4 - x_3) - (y_4 - y_3)(x_2 - x_1)} \quad (2)$$

where, $G_1$ to $G_4$ show the maximum density at the coordinates $(X_n, Y_n)(n=1, 2, 3$ and $4)$.

Figure 9:
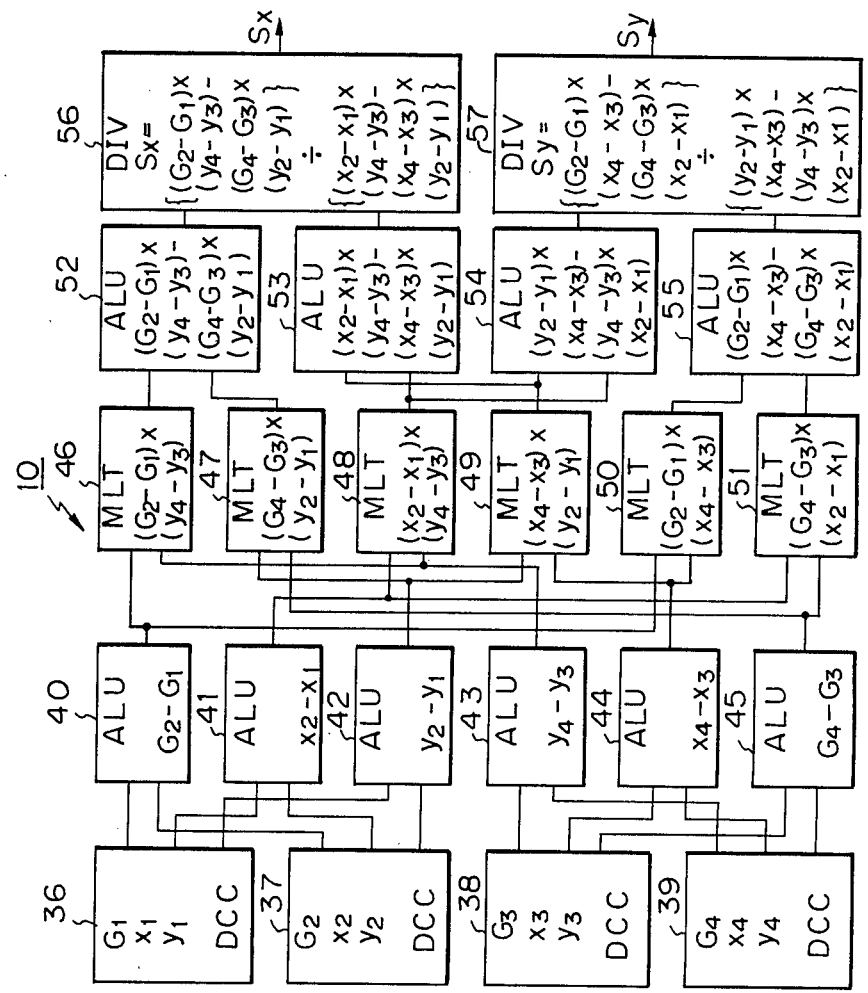
FIG. 9 is a detailed block diagram of the density slope detection circuit shown in FIG. 6.

FIG. 9 is a detailed block diagram of the density slope detection circuit shown in FIG. 6. In FIG. 9, reference numbers 36 to 39 represent maximum density calculation circuits (DCC), 40 to 45 arithmetic circuits (ALU), 46 to 51 multipliers (MLT), 52 to 55 also arithmetic circuits, 56 and 57 dividers (DIV).

Each of the maximum density calculation circuits 36 to 39 is used for obtaining a maximum density Gn and its coordinate $(x_n, y_n)$ with respect to each of the small areas A1 to A4. The arithmetic circuits 40 to 45 calculate the formulas $(G_2-G_1)$, $(x_2-x_1)$, $(y_2-y_1)$, $(y_4-y_3)$, $(x_4-x_3)$, $(G_4-G_3)$. The multipliers 46 to 51 calculate the following formulas:

$(G_2-G_1)\times(y_4-y_3)$, at 46, $(G_4-G_3)\times(y_2-y_1)$, at 47, $(x_2-x_1)\times(y_4-y_3)$, at 48, $(x_4-x_3)\times(y_2-y_1)$, at 49, $(G_2-G_1)\times(x_4-x_3)$, at 50, $(G_4-G_3)\times(x_2-x_1)$, at 51, The arithmetic circuits 52 to 55 calculate the following formulas:

$(G_2-G_1)\times(y_4-y_3)-(G_4-G_3)\times(y_2-y_1)$, at 52, $(x_2-x_1)\times(y_4-y_3)-(x_4-x_3)\times(y_2-y_1)$, at 53, $(y_2-y_1)\times(x_4-x_3)-(y_4-y_3)\times(x_2-x_1)$, at 54, $(G_2-G_1)\times(x_4-x_3)-(G_4-G_3)\times(x_2-x_1)$, at 55, The divider 56 calculates the density slope Sx based on the outputs of the circuits 52 and 53, and the divider 57 calculates the density slope Sy based on the outputs of the circuits 54 and 55.

Figure 10:
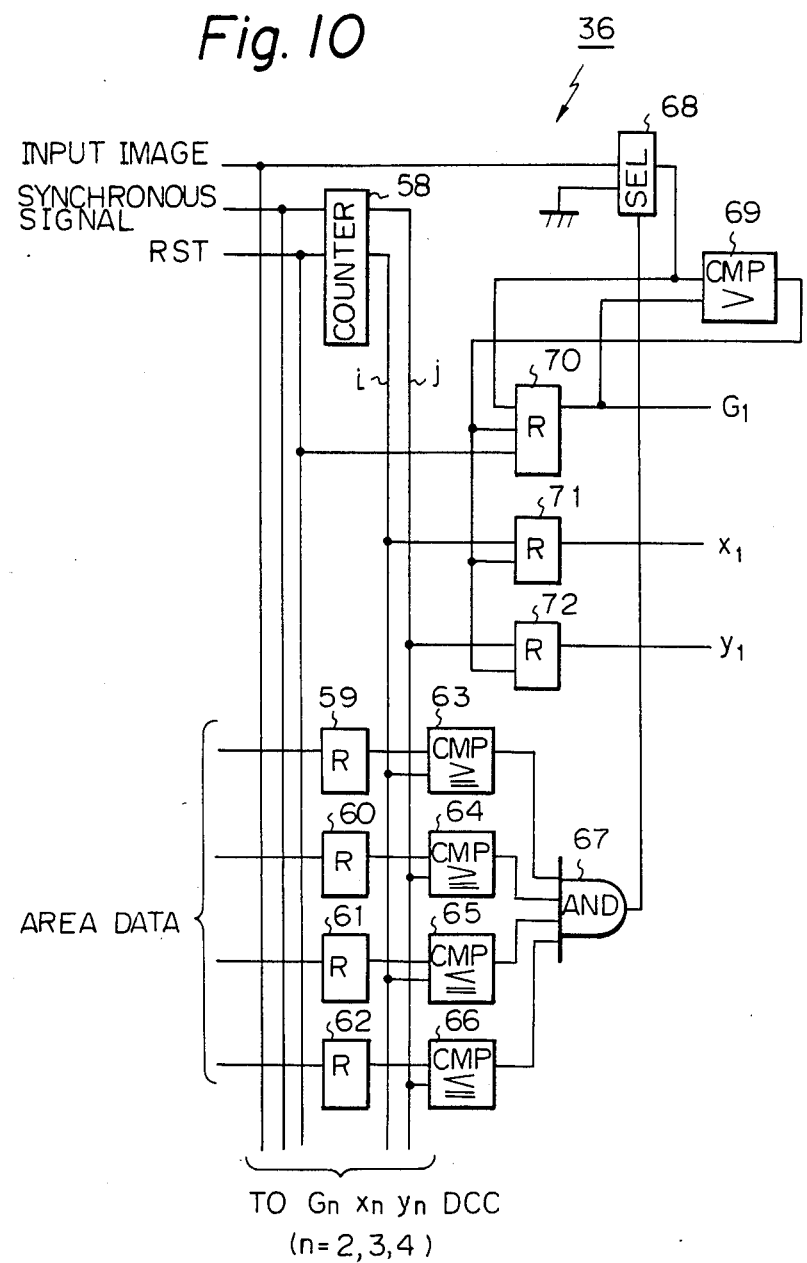
FIG. 10 is a detailed circuit of the maximum density calculation circuit shown in FIG. 9.

FIG. 10 is a detailed circuit of each of the maximum density calculation circuits 36 to 39 shown in FIG. 9. In FIG. 10, reference number 58 represents a counter, 59 to 62 registers, 63 to 66 comparators, 67 an AND circuit, 68 a selector, 69 a comparator, and 70 to 72 registers.

The counter 58 counts up a synchronous signal output from the control unit, which is synchronized with a picture element signal for the input image. The upper count number represents the Y-coordinate on the two-dimensional coordinate and is output to a data line j. The lower count number represents the X-coordinate on the two-dimensional coordinate and is output to a data line i. Each of the registers 59 to 62 stores a minimum value of the X-coordinate, a minimum value of the Y-coordinate, a maximum value of the X-coordinate, and a maximum value of the Y-coordinate. Each of the comparators 63 to 66 outputs "1", in the coordinate value of the input picture element at this point, when the value of the X-coordinate exceeds the value of the register 59, when the value of the Y-coordinate exceeds the value of the register 60, when the vlaue of the X-coordinate is lower than the value of the register 61, and when the value of the Y-coordinate is lower than the value of the register 62. Each of the comparators 63 to 66 also outputs "0" except for the above cases. That is, the output of the AND circuit 67 becomes "1" when the coordinate values of the input picture elements at this point in the square area are defined by coordinates of the registers 59 to 62.

The selector 68 outputs "000 ... 0" when the output of the AND circuit 67 is "0", and outputs the input density value of the picture element at this point when the output of the AND circuit 67 is "1". The comparator 69 compares the output of the selector 68 with the output of the register 70, and outputs "1" when the output of the selector 68 is larger than that of the register 70. The register 70 stores a maximum density $G_1$. The register 70 also stores the output of the selector 68 when the output of the comparator 69 is "1" after the register 70 is cleared by a reset signal (RST). The X and Y-coordinates of the input picture element at this point are input to registers 71 and 72 through data lines i and j when the output of the comparator 69 is "1".

Figure 11:
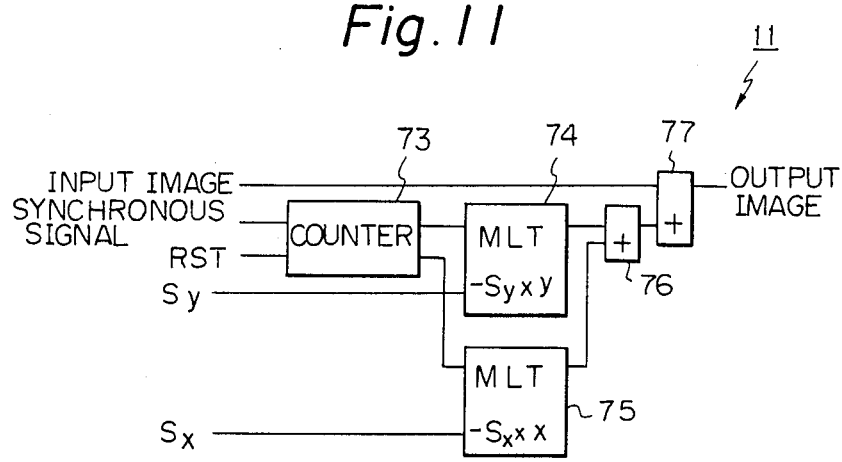
FIG. 11 is a detailed block diagram of the correction circuit shown in FIG. 6.

FIG. 11 is a detailed block diagram of the correction circuit 11 shown in FIG. 6. In FIG. 11, reference number 73 represents a counter, 74 and 75 multipliers, and 76 and 77 adders.

The counter 73 has the same function as that in FIG. 10. The counter 73 counts X-coordinate and Y-coordinate based on the synchronous signal (SYN), and outputs them to the multipliers 74 and 75. The multiplier 74 multiplies the Y-coordinate of the input picture element at this point of time by "−Sy", and outputs the result to the adder 76. The multiplier 75 also multiplies the X-coordinate of the input picture element at this point by "−Sx", and outputs it to the adder 76. The adder 76 adds both outputs of the multipliers 74 and 75. The adder 77 also adds the output of the adder 76 to the density of the input image. By these procedures, the corrected image is output from the adder 77.

Figure 12:
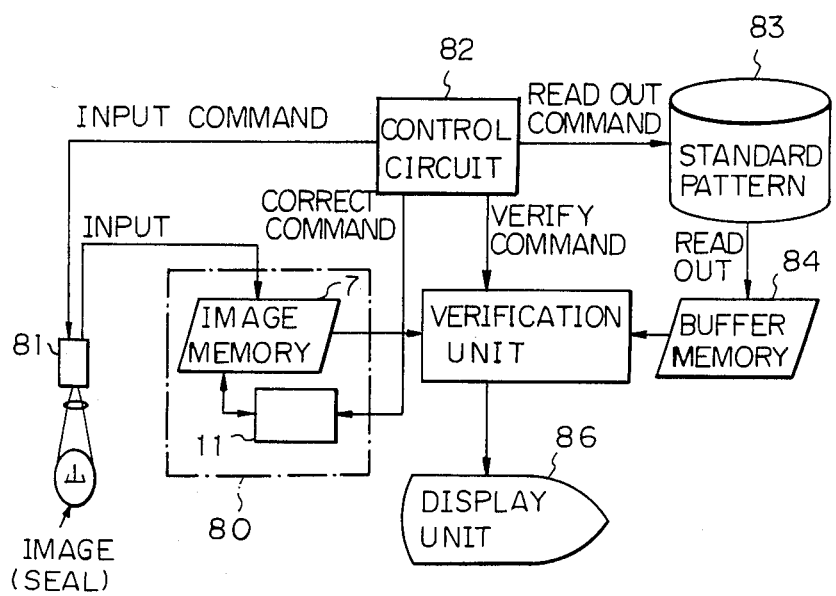
FIG. 12 is a schematic block diagram of a seal verification system using the image processing system shown in FIG. 6.

FIG. 12 is a schematic block diagram of the seal verification system using the image processing system shown in FIG. 6. In FIG. 12, reference number 80 is the same circuit as that in FIG. 6, 81 an image input unit including the TV camera 2 and the A/D converter 3, 82 a control circuit, 83 a standard pattern memory, 84 a buffer memory, 85 a verification unit, and 86 a display unit.

When the image of the seal is input from the image input unit 81 to the apparatus 80 by an input command from the control circuit 82, the image memory 7 stores the density data of the input image. The correction circuit 80 corrects the density slope or line width of the input image by a correction command from the control circuit 82. The memory 7 again stores the resultant data corrected by the circuit 11. The standard pattern memory 83 previously stores a standard pattern (for example, 16 gradations) of the registered seal. The standard pattern is read out from the memory 83 by a read out command from the circuit 82 and is stored in the buffer memory 84. The verification unit 85 verifies the input image stored in the memory 7 with the standard pattern stored in the buffer memory 84. The display unit 86 displays the resultant data verified by the unit 85.

Note, the image processing system according to the present invention can be used not only for verification of a registered seal, but also for verification of a fingerprint and a printed character, and the like.

In the above explained embodiment, the procedure for extension of the density level is performed by the threshold values and average value AV of the eight peripheral picture elements in the 3×3 area as mentioned above. However, the present invention is not limited to the above method.

Another method for extending the density level as the second embodiment of the present invention will be explained in detail hereinafter.

In this embodiment, a threshold density $G_{TH}$ of the picture element and a threshold number $K_{TH}$ of the picture element are used for the extension of the density level. This method will be explained with reference to FIGS. 13A to 13G.

Figure 13E:
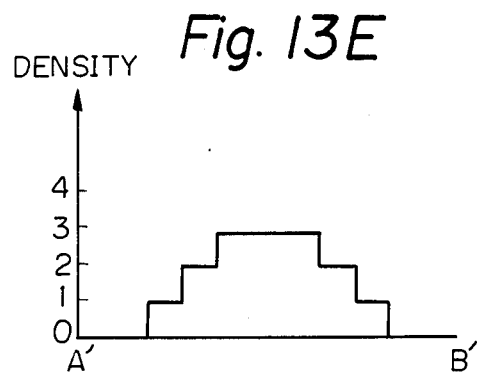
Figure 13F:
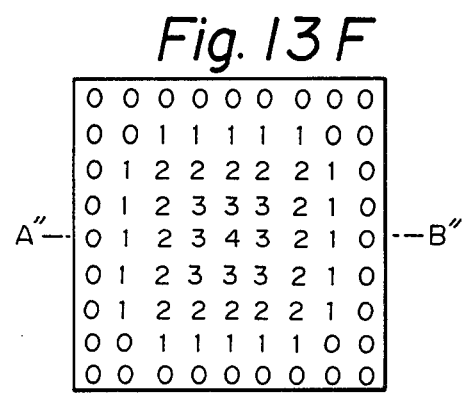
Figure 13G:
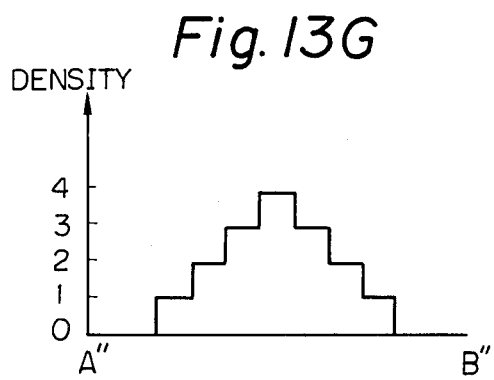

In FIG. 13A, "0", "1" and "2" are digitized density levels of the input image. The density distribution taken along the line A-B in FIG. 13A is shown in FIG. 13B. The ordinate represents the density level, and the abscissa represents the X-coordinate. As can be seen from FIG. 13C, the maximum density value is "2", and the threshold density $G_{TH}$ is set to "2". The threshold number $K_{TH}$ of the picture element is set to "8" in this embodiment. Only one picture element is over the $G_{TH}$ (=2) in the area A (1<KTH), three over the $G_{TH}$ in the area B (3<KTH), and eight over the $G_{TH}$ in the area C (8=$K_{TH}$). Accordingly, the density level of the picture elements A and B are not changed, and the density level of the center of the picture element C is added by "1" to the density level "2". The same procedures as above are performed in all areas of the image shown in FIG. 13C, so that the new density pattern is obtained as shown in FIG. 13D. Next, the density distribution taken along the line A'-B' in FIG. 13D is shown in FIG. 13E. The extension of the density level is performed by the above procedures as follows. That is, a new threshold densit $G_{TH}$ is set to "3" and the same procedures as above are performed in all areas of the image shown in FIG. 13D, so that new density pattern is obtained as shown in FIG. 13F. The density distribution taken along the line A"-B" in FIG. 13F is shown in FIG. 13G. As can be seen from FIG. 13F, since only one picture element has the maximum density value (=4), the extension of the density level is no longer performed.

As explained above, this procedure is performed by adding "1" to the maximum density of the image just before the extension. In an actual extension procedure, the value to be added to the center of the picture element should be changed at every extension in correspondence with the density slope of the object.

Figure 14A:
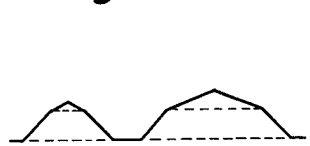
FIGS. 14A and 14B are schematic views for explaining an inappropriate extension.
Figure 14B:
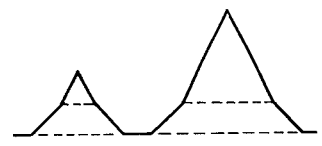

FIGS. 14A and 14B show examples of inappropriate extension caused by adding an unsuitable value.

In order to obtain the suitable value to be added, a density gradient should be obtained in the density portion in which the density level is changed. The extension should be performed by using this density gradient. The density gradient can be obtained from the difference between each of the density levels of neighboring picture elements.

Figures 15, 17:
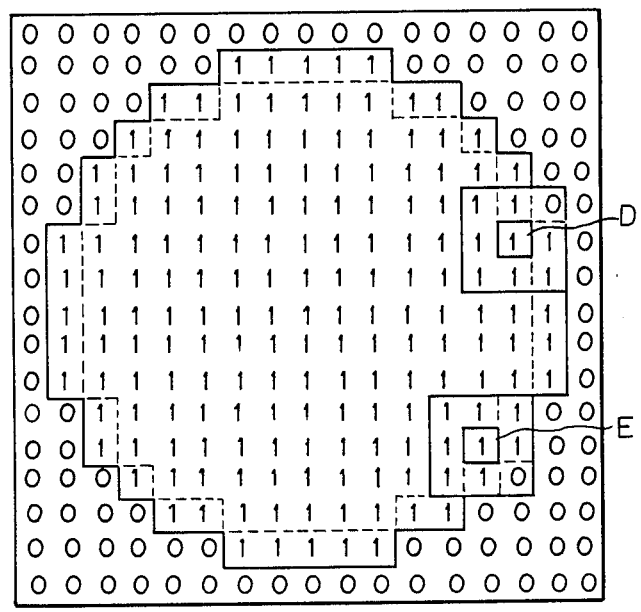
FIG. 17 is a schematic view for explaining a digitized circle.

In FIG. 15, reference letters LU to RD represent each of the picture elements. The density gradient at the center of the picture element MM is given by the following formulas.

When $|RD-MM|=0$ or $|MM-LU|=0$, density gradient RDLU=0;
When $|RD-MM|\neq 0$ or $|MM-LU|\neq 0$, RDLU=-maximum value of ($|RD-MM|$, $|MM-LU|$);
When $|RM-MM|=0$ or $|MM-LM|=0$, RMLM=0;
When $|RM-MM|\neq 0$ and $|MM-LM|\neq 0$, RMLM=max($|RM-MM|$, $|MM-LM|$);
When $|RU-MM|=0$ or $|MM-LD|=0$, RULD=0;
When $|RU-MM|\neq 0$ and $|MM-LD|\neq 0$, RULD=max($|RU-MM|$, $|MM-LD|$);
When $|MD-MM|=0$ or $|MM-MU|=0$ MDMU=0; and,
When $|MD-MM|\neq 0$ and $|MM-MU\neq 0$ MDMU=-max($|MD-MM|$, $|MM-MU|$);

Accordingly, the density gradients as a typical future are given by the formula, max(RDLU, RMLM, RULD, MDMU)     (3)

Figure 16:
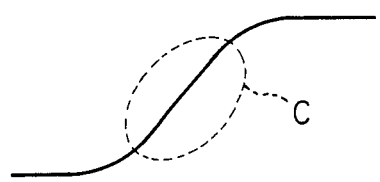
FIGS. 15 and 16 are schematic views for explaining the calculation of density gradient.

The formula (3) is used for calculating the density gradient shown by the dotted line C in FIG. 16.

In FIG. 17, the solid line represents an actual digital circle. The dotted line represents a digitized circle. In this case, the threshold number $K_{TH}$ of the picture element for the extension is set to "7" because the dotted line circle is more approximate to the actual circle. Accordingly, when the threshold number $K_{TH}$ is "7", if the threshold densit $G_{TH}$ is set to "1", the density levels of the picture elements D and E are extended as shown in FIG. 17.

Figure 18A:
FIGS. 18A to 18D are schematic views for explaining reduction of the density level.
Figure 18B:
Figure 18C:
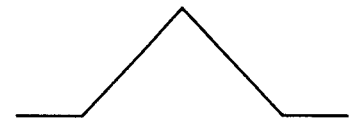
Figure 18D:
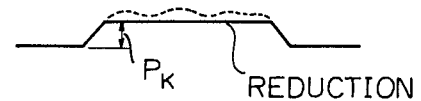

FIG. 18A shows the precedure when containing noise near the maximum value of the density level. In the above-explained extension procedures, this noise level is extended as shown in FIG. 18B. However, since the extension should be performed as shown in FIG. 18C, once the density level is reduced as shown by the solid line in FIG. 18D, then the extension is performed by the above-explained procedure. In order to determine the threshold level PK for eliminating the influence of noise and for reducing the density level, a density histogram as shown in FIG. 19 is used.

Figure 19:
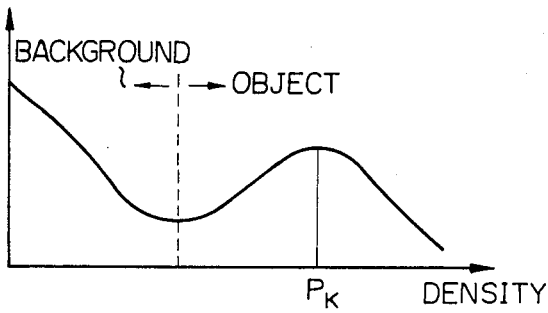
FIG. 19 is a schematic view of a density histogram.

In FIG. 19, the ordinate represents the number N of picture elements, and the abscissa represents the density level D. The left side of the dotted line represents the background of the image and the right side of the dotted line represents the object image, for example, a seal. In this case, the maximum value $P_k$ of the density in the object is used as the threshold level TH of the density level.

Figure 20:
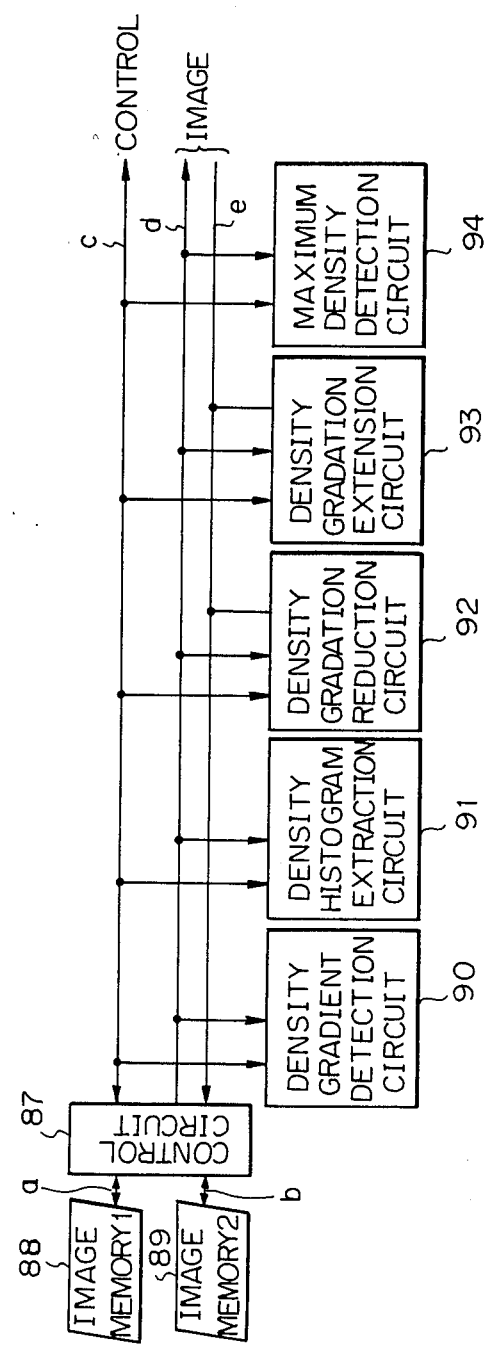
FIG. 20 is a schematic block diagram of another density level extension circuit.

FIG. 20 shows a schematic block diagram for processing the above-procedure of the extension of the density level. In FIG. 20, reference number 87 represents a control circuit, 88 and 89 image memories, 90 a density gradient detection circuit, 91 a density histogram extraction circuit, 92 a density gradation reduction circuit, 93 a density gradation extension circuit, and 94 a maximum density detection circuit.

The control circuit 87 controls read out and write of the memories 88 and 89, sets different parameters to be sent to circuits 90 to 94, and calculates different threshold values.

Memories 88 and 89 store the image before processing, during processing, and after processing.

The density gradient detection circuit 90 reads out the contents of the memory 88 through a data line d, calculates the sum of density gradient value and number of picture elements not having a density gradient of "0" in one image, and outputs the resultant data to the circuit 87 through a data line C. The sum of the density gradient value is divided by the number of density gradients, so that an average density gradient AV can be obtained in the control circuit 87.

The density histogram extraction circuit 91 reads out the contents of the memory 89 through a data line d, calculates the density histogram (number of picture elements per each density value), and outputs this to the control circuit 87 through a data line C. The control circuit 87 detects peaks and dips in the density histogram, and calculates the threshold value $P_k$ to be used for the reduction of the density level.

The density gradation reduction circuit is used for eliminating the influence of noise. The circuit 92 obtains the threshold value $P_k$ from the control circuit 87 through a data line C, reads out the contents of the memory 88 through the data line d, and outputs the image having a reduced density level to the memory 89 through the data line e.

The density gradation extension circuit 93 obtains the threshold value used for the extension through the data line C, reads out the contents of the memory 88 through the data line d, and outputs the image having a once-extended density level to the memory 89 through the data line e.

The maximum density detection circuit 94 reads out the contents of the memory through the data line d, and calculates the $Gn(x_n, y_n)$ and Sx, Sy. The Sx and Sy are input to the control circuit 87 through the data line C.

Figure 21:
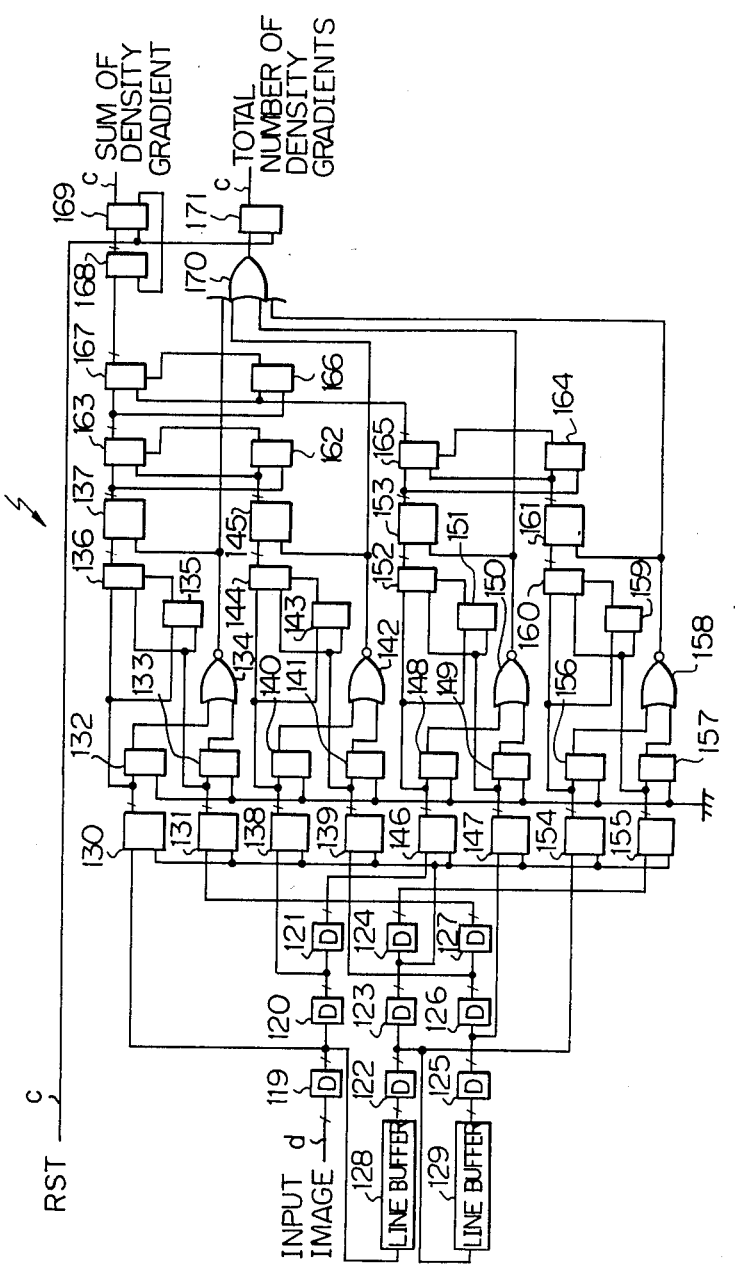
FIG. 21 is a detailed block diagram of the density gradient detection circuit shown in FIG. 20.
Figure 22:
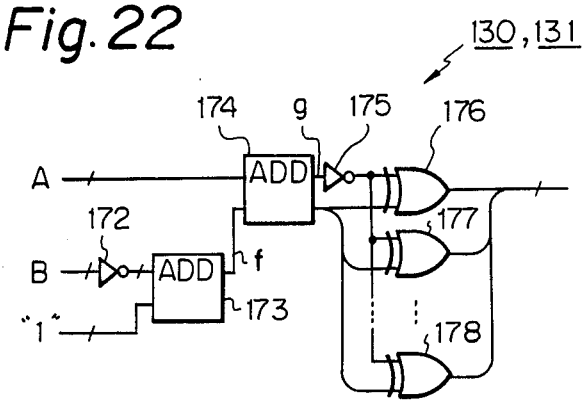
FIG. 22 is a detailed block diagram of the absolute value calculation circuit shown in FIG. 21.
Figure 23:
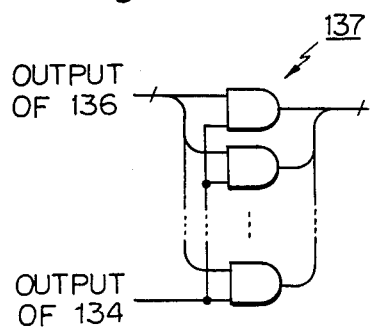
FIG. 23 is a detailed block diagram of the AND circuit shown in FIG. 21.

FIG. 21 is a detailed block diagram of the density gradient detection circuit 90 shown in FIG. 20. In FIG. 21, reference numbers 119 to 127 represent delay circuits. As mentioned before, each of the outputs of the delay circuits represents the density value of an optical 3×3 area in the image. Reference numbers 128 and 129 represent line buffers storing and outputting three picture elements of one line. Reference numbers 130 and 131 represent absolute value calculation circuits. Each of the circuits 130 and 131 calculates "|LU−MM|, |MM−RD|". The functions of these circuits are explained with reference to FIG. 22. In FIG. 22, reference letters A and B represent a positive value, for example, "1". The input signal B is inverted by an inverter 172, and "1" is added by an adder 173. Accordingly, an output f of the adder 173 becomes a complement of "2" of input B. The output f is also added to the input signal A by the adder 174. A carry signal g of the adder 174 becomes "1" when A is larger than or equal to B, and becomes "0" when A is smaller than B. That is, when (A-B) is larger than or equal to zero, the output of the adder 174 is used with its own output as resultant data, and when (A-B) is smaller than zero, the value inverted by an inverter 175 is used as the resultant data. Reference numbers 176 to 178 are exclusive OR circuits. Each of the outputs is obtained based on OR logic between the output of the inverter 175 and the output of the adder 174. In FIG. 21, reference numbers 132 and 133 represent comparators. Each of the comparator checks whether the outputs of the circuits 130 and 131, i.e., |LU−MM| and |MM−RD|, are "0" or "1". When the output is "0", the comparator outputs "1". Reference number 134 represents a NAND logic circuit. The NAND circuit 134 outputs "1" when only both inputs are "0". Reference number 135 represents a comparator, and 136 a selector. The comparator 135 compares the value |LU−MM| with the value |MM−RD|, and the selector 136 outputs the larger value. Reference number 137 represents an AND circuit. This circuit 137 is shown in FIG. 23 in detail. The output of the selector 136 becomes "0" when at least one of |LU−MM| or |MM−RD| is "0" in the circuit 137. Circuits 138 to 145, 146 to 153, and 154 to 161 have the same functions as the circuits 130 to 137. These circuits calculate |MU−MM| and |MM−MB|, |RU−MM| and |MM−LB|, and |LM−MM| and |MM−RM| by the same method as mentioned above. Reference numbers 162, 164, and 166 represent comparators, and 163, 165, and 167 selectors. A maximum value among the outputs of the AND circuits 137, 145, 153, and 161 is output from the selector 137. Reference number 168 is an adder and 169 a register. The register 169 is cleared by a reset signal (RST), and then the sum of contents of the register 169 and the output of the selector 167 are obtained. These values are again stored in the register 169, so that the sum of the density gradient values is stored in the register 169. Reference number 170 is an OR Circuit and 171 a counter. After the counter 171 is cleared by the reset signal (RST), the sum of the density gradient values is stored in the counter 171 when the density gradient is not "0".

Figure 24:
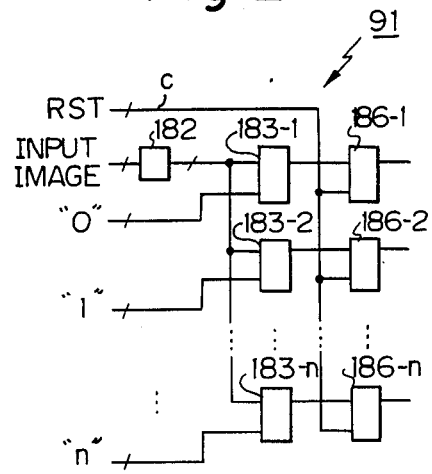
FIG. 24 is a detailed block diagram of the density histogram extraction circuit shown in FIG. 20.

FIG. 24 is a detailed block diagram of the density histogram extraction circuit 91 shown in FIG. 20. Reference number 182 is a delay circuit operated by every one clock of the picture element. The output of the circuit 182 is the density value of the input image as explained before. Reference numbers 183-1 to 183-n are comparators, and each of these comparators 183-1 to 183-n compares the output of the delay circuit 182 with each "1", "2", ... "n" of the density value of the input image and outputs "1" only when the output of the delay circuit is equal to any of "1", "2" ... "n". Reference numbers 186-1 to 186-n are counters and each of the counters 186-1 to 186-n are cleared by the reset signal (RST), is added one by one at every output of "1" in each of comparators 183-1 to 183-n, and is stored by the number of picture elements having density values.

Figure 25:
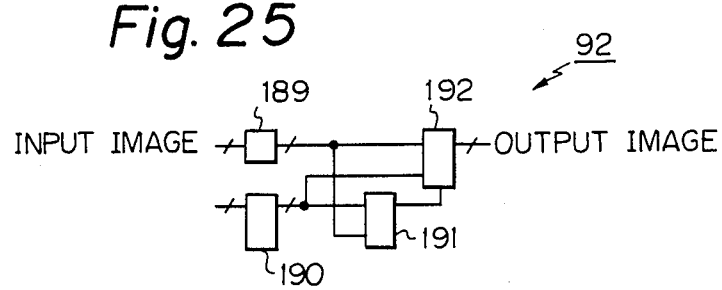
FIG. 25 is a detailed block diagram of the density gradation reduction circuit shown in FIG. 20.

FIG. 25 is a detailed block diagram of the density gradation reduction circuit 92 shown in FIG. 20. In the figure, 189 is a delay circuit operated by every one clock as explained before, 190 is a register which sets the threshold value $P_k$ of the density value by the control circuit 87, 191 a comparator, and 192 a selector. The comparator 191 compares the output of the delay circuit 189 with the threshold value set to the register 190. The comparator 191 also outputs a signal to the selector 192 so as to obtain the threshold value as the output of the selector 192 when the output of the delay circuit 189 is smaller than the threshold value, and to obtain the output of the delay circuit 189 as the output of the selector 192 when the output of the delay circuit 189 is larger than the threshold value.

Figure 26:
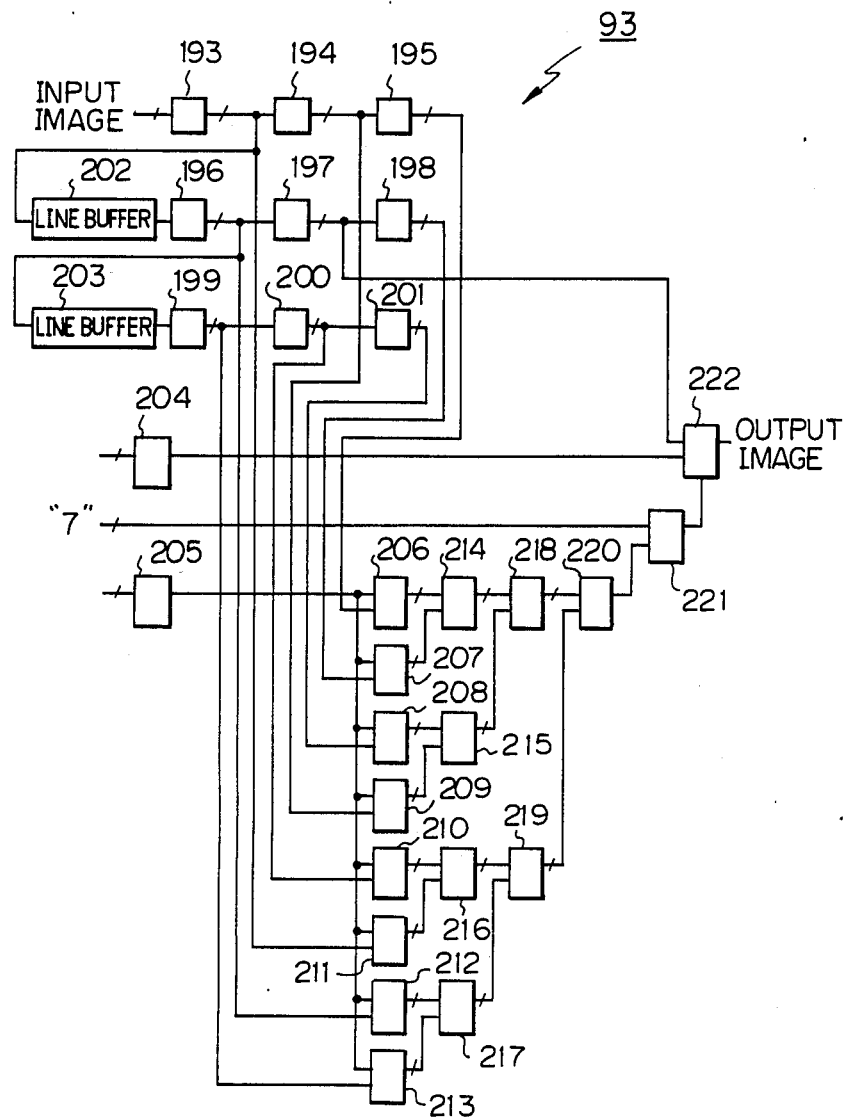
FIG. 26 is a detailed block diagram of the density gradation extension circuit shown in FIG. 20.

FIG. 26 is a detailed block diagram of the density gradation extension circuit 93 shown in FIG. 20. This circuit is used for upward extension of the density level. As explained in FIG. 7, reference numbers 193 to 201 represent delay circuits, 202 and 203 line buffers, and 204 and 205 registers. Each of the registers 204 and 205 stores the density values for the extension (maximum density value before extension plus average density gradient AV), and the threshold value $G_{TH}$ for the extension (maximum density value before extension) based on a command from the control circuit 87. Reference numbers 206 to 213 are comparators, and each comparator 206 to 213 compares the density value with the threshold value $G_{TH}$ of the picture element in the 3×3 area, and outputs "1" when the density value of the picture element is larger than the threshold value. Reference numbers 214 to 220 are adders. The output of the adder 220 is the sum of outputs of comparators 206 to 213. Reference number 22 is a comparator, and 222 is a selector. The selector 222 outputs the value of the picture element of the input image when the output of the adder 220 is smaller than the threshold value $G_{TH}=7$, and outputs the value set to the register 204 when the output of the adder 220 is larger than the threshold value $G_{TH}=7$.

The maximum density detection circuit 94 shown in FIG. 20 is the same circuit as the density slope detection circuit 10 shown in FIGS. 6 and 9. Therefore, a detailed explanation thereof is omitted.

As explained above, the density slope Sx and Sy are obtained by the circuit 94. Accordingly, the correction image can be obtained by correcting the density slope after inputting the Sx and Sy density slopes to the correction circuit 11.

Another embodiment of the present invention will be explained in detail hereinafter.

In this embodiment, the correction of line width is performed based on the corrected image obtained by the correction of the density slope mentioned above.

FIGS. 27A to 27F show the procedures for performing the correction of line width.

Figure 27A:
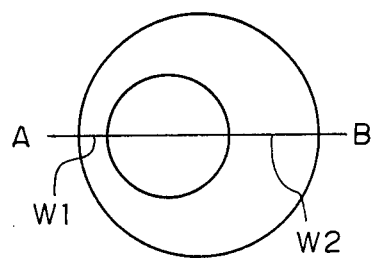
FIGS. 27A to 27F are schematic views for explaining correction of the line width of the input image according to the present invention.
Figure 27B:
Figure 27C:
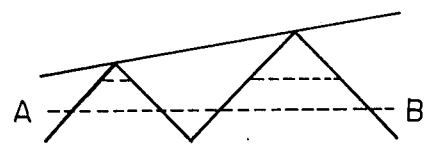
Figure 27D:
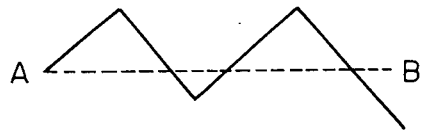
Figure 27F:
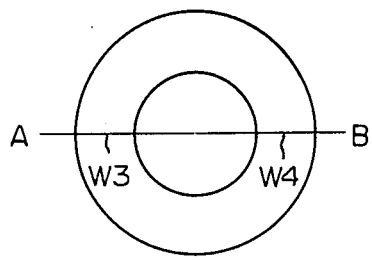
Figure 27E:
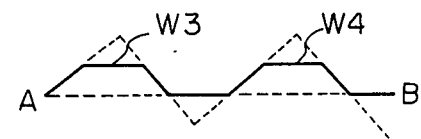

FIG. 27A shows the image, for example, a seal, reproduced on the document. As can be seen from the drawing, the line width W1 on the left is narrower than the line width W2 on the right. That is, on the left the seal was under a weak pressure, and on the right the seal was under a strong pressure. The density distribution taken along the line A-B is shown in FIG. 27B. The extended density distribution, explained in FIGS. 5A to 5G, is shown in FIG. 27C. The density slope can be detected by coupling both peaks of the density distribution. Equal peaks of the density distribution can be obtained by adding the converse correction density slope as shown in FIG. 27D. The line width W3 is made equal to the line width W4 by cutting with a suitable threshold level based on the density histogram before the extension of the density gradation. Accordingly, as can be seen from FIG. 27F, the image having the equal line widths W3 and W4 can be obtained by these procedures.

FIG. 28 is the same as FIG. 19 except that another threshold value $TH_V$ is applied. Both threshold values $TH_P$ and $TH_V$ are used for performing the reduction of the density level. When the density value of any picture element is smaller than the threshold value $TH_V$, its density value becomes the threshold value. When the density value of any picture element is larger than the threshold value $TH_P$, its density value becomes the threshold value.

FIGS. 29A and 29B are drawings corresponding to FIG. 18. In FIG. 27, when there is noise in the neighborhood of the maximum density level at the time of the extension of the density level, the reduction R of the density level is performed as shown by the solid line in FIG. 29B.

Figure 30A:
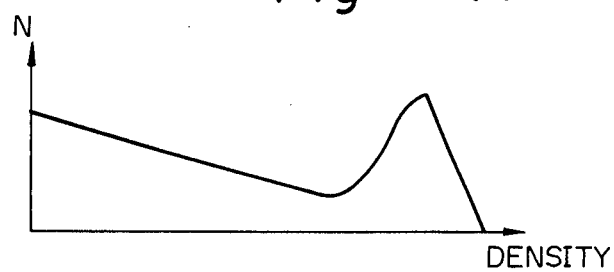
FIGS. 30A to 30E are schematic views of the density histogram after correction of the density slope.
Figure 30B:
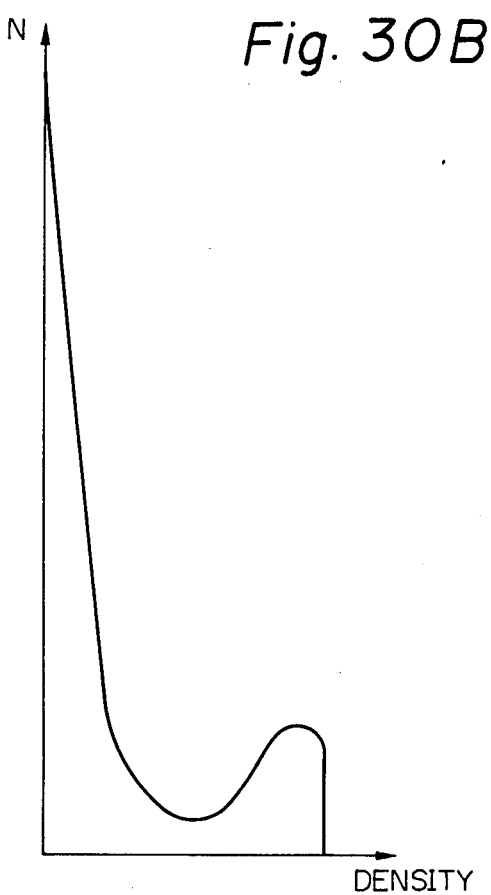
Figure 30C:
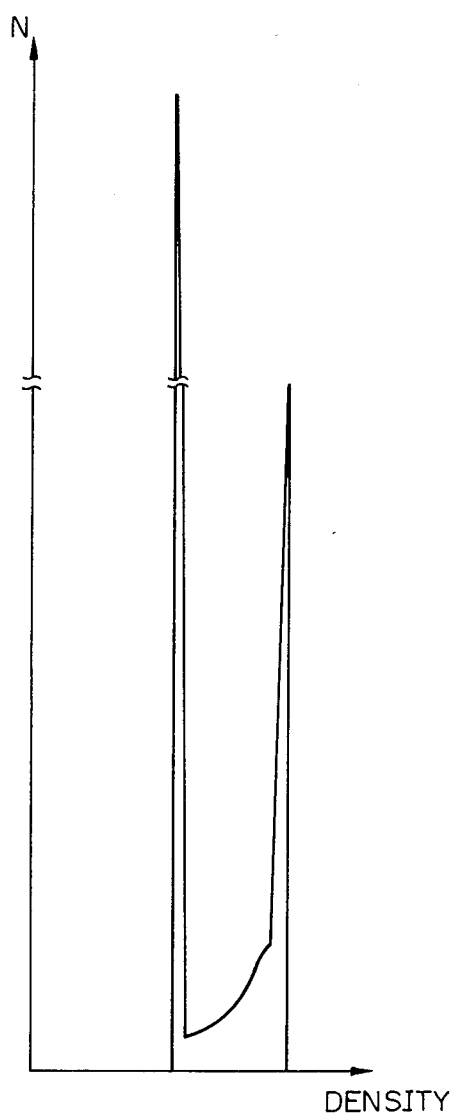
Figure 30D:
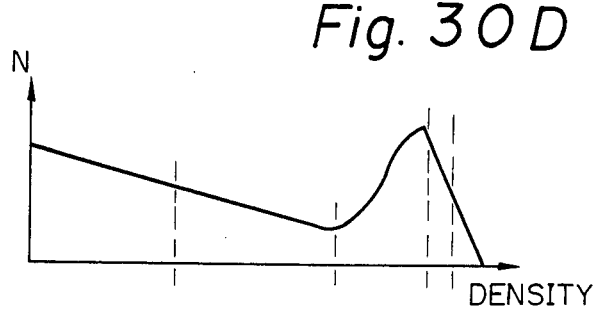
Figure 30E:
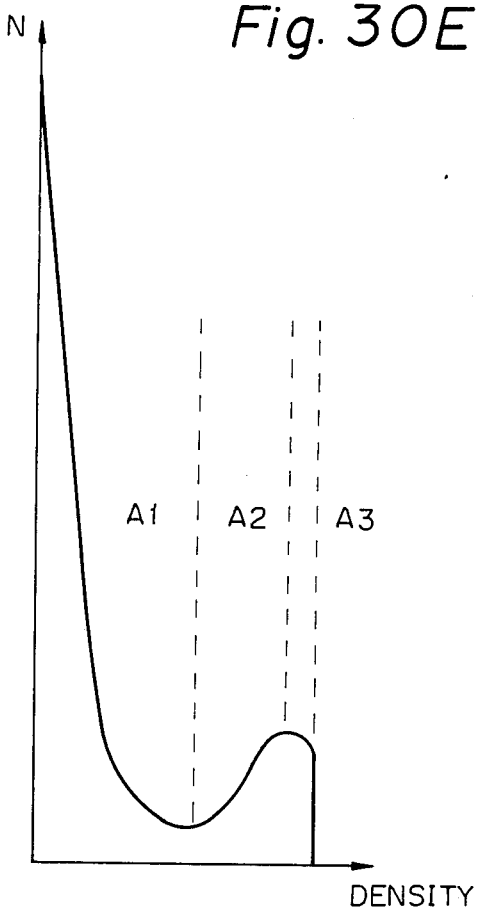

FIG. 30A shows a density histogram for the image after the density level is extended and the density slope is corrected. FIGS. 30B and 30E show the original density histogram and FIG. 30C shows a density histogram representing the reduced density gradation of the density histogram shown in FIG. 30B. FIG. 30D shows the relationships between FIG. 30A and FIG. 30B. As shown in FIG. 30D, the downward extension of the density level is performed outside of the original density value, as shown by the A1, and the upward extension of the density level is performed inside the original density value. Therefore, the number of picture elements in the downward density level is more than the number of picture elements in the upward density level. A normalization of the density gradation is performed by fitting the configuration of the density histogram shown in FIG. 30A to that of the density histogram shown in FIG. 30B. That is, as shown in FIG. 30D, the number of density values is counted from the higher portion A3 of the density histogram shown in FIG. 30E, and this number of the density values obtained by the counting is used as the number of density values for deciding the configuration of the density histogram shown in FIGS. 30A and 30D.

Figure 31A:
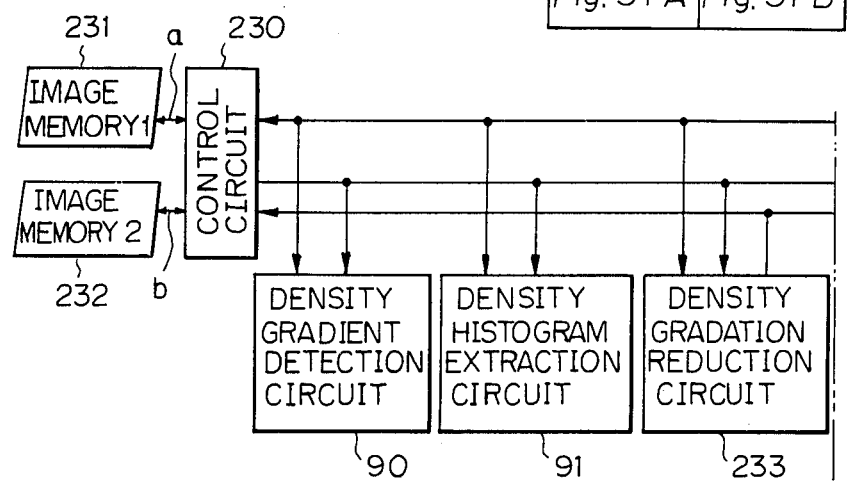
Figure 31B:
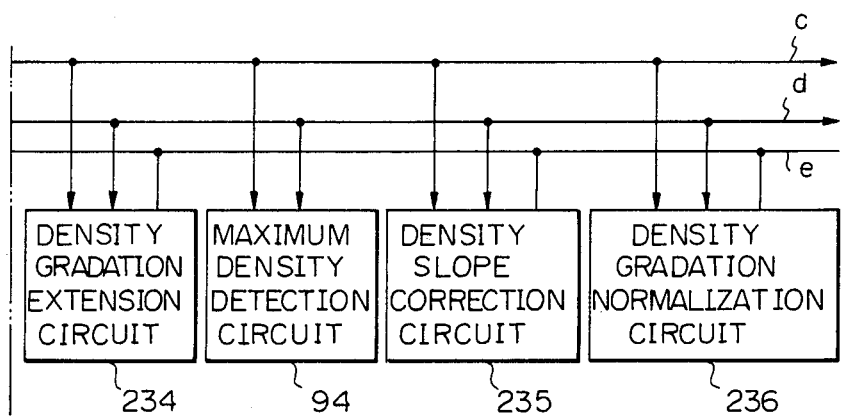

FIGS. 31A and 31B show another embodiment of the block diagram shown in FIG. 20.

A density gradation reduction circuit 233 comprises similar functions to those the density gradation reduction circuit shown in FIG. 20, but an additional function is provided in order to process another threshold value $TH_V$. That is, this circuit 233 receives threshold values $TH_V$ and $TH_P$ obtained by the density histogram extraction circuit 91, and restores the density distribution as shown by the actual line in FIG. 29B. This restored image is output to the control circuit 87 through the data line e.

A density gradation extension circuit 234 also comprises similar functions to those of the density gradation extension circuit shown in FIG. 20. This circuit 234 receives the necessary parameters for the extension (threshold value of the density value and threshold value after extension) through the data line c, and outputs the image of the once-extended density level of the input image through the data line e.

A density slope correction circuit 235 receives the density slope to be corrected through the data line c, and outputs the corrected image of the density slope of the input image. Operation of this circuit is the same as the circuit shown in FIG. 11.

A density gradation normalization circuit 236 receives a density gradation normalization data (the density value and its threshold value) through the data line c, and extends the density level. This circuit 236 also receives the corrected image for the density slope through the data line d, and outputs the image corrected to the original density level through the data line e.

Figure 32:
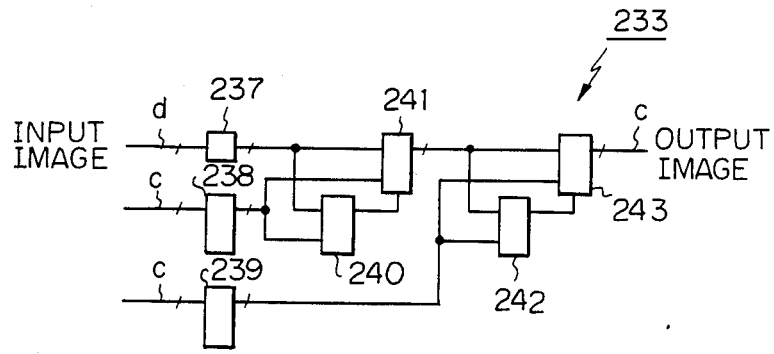
FIG. 32 is a detailed block diagram of the density gradation reduction circuit shown in FIG. 31.

FIG. 32 is the same circuit as the density gradation reduction circuit 92 shown in FIG. 25 except that a circuit for processing another threshold value $TH_V$ is added. As mentioned above, reference number 237 represents a delay circuit, and 238 and 239 registers. The threshold values $TH_V$ and $TH_P$ are set to the registers 238 and 239. Reference number 240 is a comparator and 240 a selector. The comparator 240 compares the output of the delay circuit 237 with the threshold value $TH_V$ stored in the register 238. The comparator 240 controls the output of the selector 241 so as to obtain the threshold value $TH_V$ as the output of the selector 241 when the output of the delay circuit 237 is smaller than the threshold value $TH_V$, and to obtain the output of the delay circuit 237 as the output of the selector 241 when the output of the delay circuit 237 is larger than the threshold value $TH_V$.

Reference 242 is also a comparator and 243 also a selector. The comparator 242 compares the output of the selector 241 with the threshold value $TH_P$ stored in the register 239. The comparator 242 controls the output of the selector 243 so as to obtain the threshold value $TH_P$ as the output of the selector 243 when the output of the selector 241 is larger than the threshold value $TH_P$, and to obtain the output of the selector 241 as the output of the selector 243 when the output of the selector 241 is smaller than the threshold value $T_{HP}$.

Figure 33B:
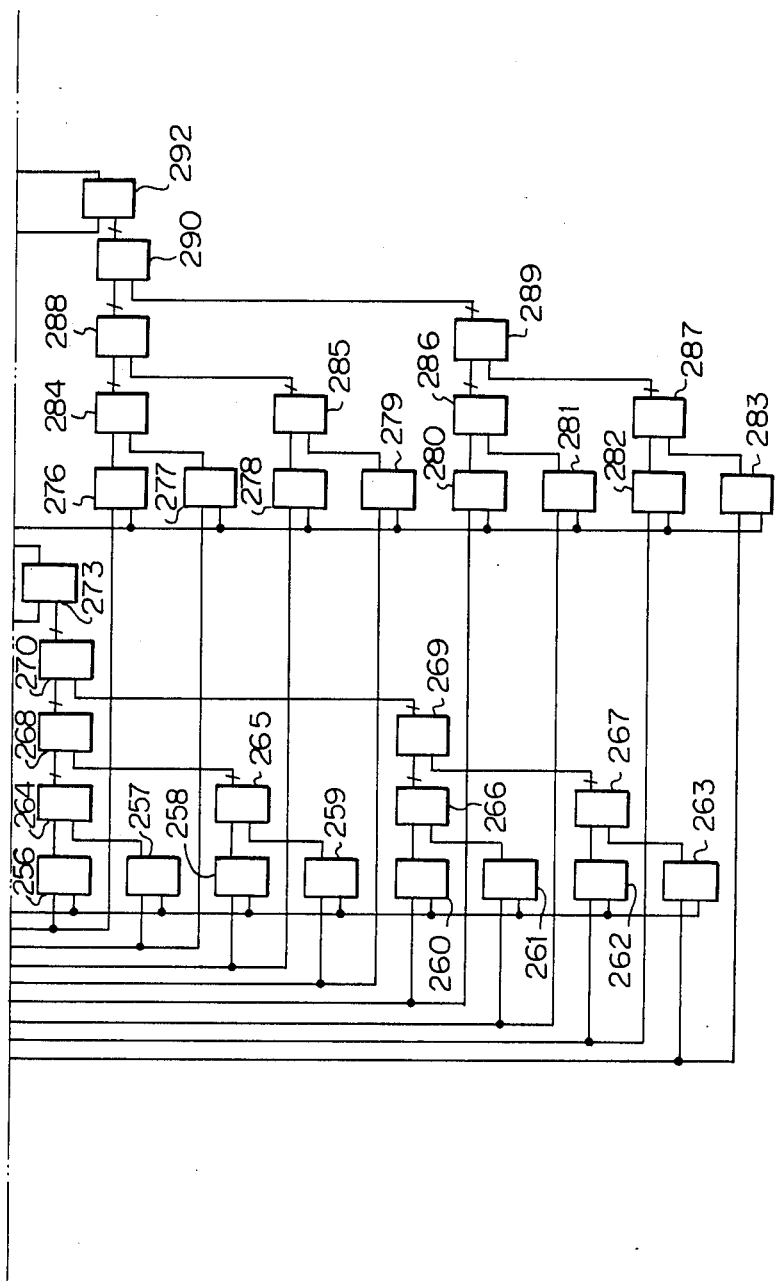

FIGS. 33A and 33B are the same circuit as the density gradation extension circuit 93 shown in FIG. 26 except that the circuit for processing the downward extension is added. As mentioned above, references 244 to 252 are delay circuits, 253 and 254 line buffers, and 255 a register. The register 255 stores the threshold value for the downward extension of the density level. References 256 to 263 are comparators, 264 to 270 adders, 271 and 272 registers, 273 a comparator, and 274 a selector. Reference 275 is a register which stores the threshold value for the upward extension of the density level, 276 to 283 are comparators, 284 to 290 adders, 291 a register, 292 a comparator, and 293 a selector. The functions of this circuit are basically the same as those of the circuit 93 shown in FIG. 26.

Figure 34:
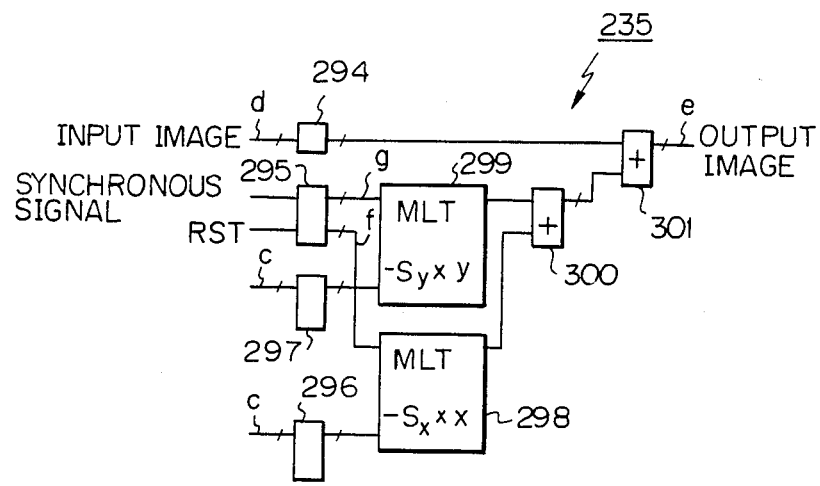
FIG. 34 is a detailed block diagram of the density slope correction circuit shown in FIG. 31.

FIG. 34 is the same circuit as the correction circuit 11 shown in FIG. 11 except that registers 296 and 297 are added. Each of the registers 296 and 297 stores the density slopes Sx and Sy obtained by the control circuit 230, based on parameters detected by the maximum density detection circuit 94. As explained above, multipliers 298 and 299 calculate the density slopes $(-Sx \times x)$ and $(-Sy \times y)$ to be corrected.

Figure 35:
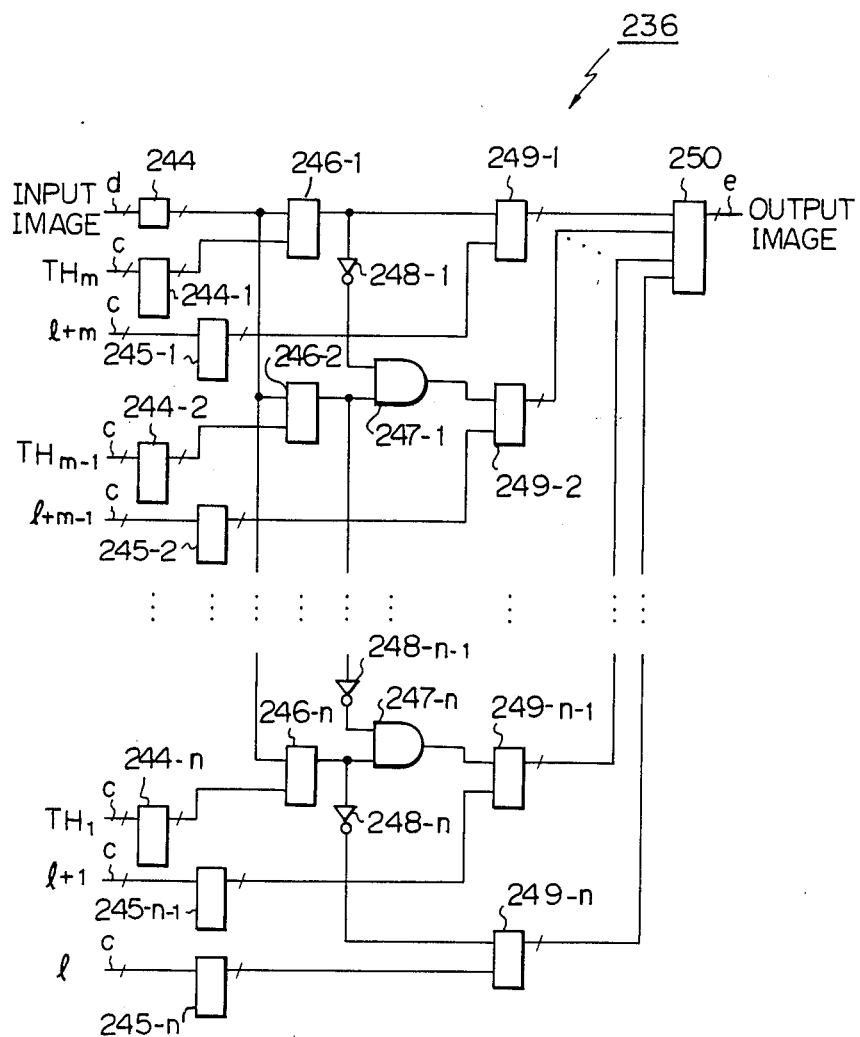
FIG. 35 is a detailed block diagram of the density gradation normalization circuit shown in FIG. 31.

FIG. 35 is a detailed block diagram of the density gradation normalization circuit 236. Before the explanation of this circuit, the meaning of normalization will be explained with reference to FIG. 36.

Figure 36:
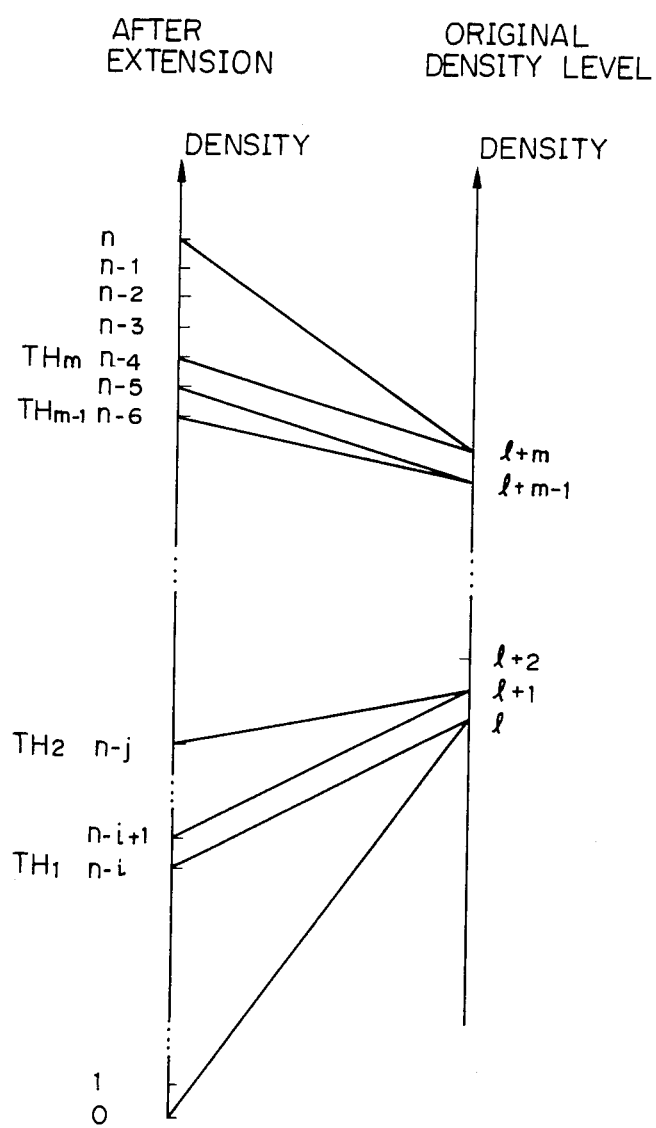
FIG. 36 is a schematic view for explaining normalization.

In FIG. 36, the ordinate axis at the left represents the density after extension of the density level, and that at the right represents the original density level of the image. "0" to "n" represent "n+1" gradation and "1" to "1+m" represent "m+1" gradation (n≧m). The threshold values for normalization are up to "m", and these threshold values are shown by $TH_1$ to $TH_m$. Reference number 244 in FIG. 35 represents a delay circuit. The output of this circuit 244 also represents the density value of the input image. References 244-1 to 244-n represent registers which store each of the threshold values THx (x=1, 2, ---, m).

The threshold value is determined as follows.

Table 1 shows the density histogram of eleven gradations after extension of the density level, while Table 2 shows the density histogram of four gradations of the original image.

TABLE 1

| Gradation value | 5 | 4 | 3 | 2 | 1 | 0 | −1 | −2 | −3 | −4 | −5 |
|---|---|---|---|---|---|---|---|---|---|---|---|
| Number | 1 | 1 | 1 | 1 | 1 | 2 | 2 | 2 | 5 | 6 | 6 |

TABLE 2

| Gradation value | 3 | 2 | 1 | 0 |
|---|---|---|---|---|
| Number | 10 | 5 | 3 | 10 |

As can be seen from these tables, the density level (gradation) "3" is "10" bits, for example, in Table 2. This "10" bits is counted from the upper portion of the density level shown in Table 1. That is, the "10" bits are "1+1+1+1+1+2+2+(2)". Accordingly, "−2" of the density level shown in Table 1 is determined as the threshold value. The same procedures are performed regarding other density levels.

These threshold values are obtained by the control circuit 230 shown in FIG. 30, wherein references 245-1 to 245-n represent registers which store density levels, and 246-1 to 246-n are comparators. Each of the comparators 246-1 to 246-n compares the density value of the input image with each of the threshold values, and outputs "1" when the density value is larger than the threshold value and outputs "0" when the density value is smaller than the threshold value. References 248-1 to 248-n are inverters, and 247-1 to 247-n are AND circuits. Where a density value of the picture element exists between the threshold values $TH_m$ and $TH_1$, in operation of the AND circuit corresponding to number "i", the number "i" AND circuit outputs "1" when the density value exists only between the threshold value $TH_{i+1}$ and $TH_i$, and outputs "0" in other cases. That is, any output of the comparator 246-1, AND circuits 247-1 to 247-n and the inverter 248-n becomes "1" when the threshold value is applied, and the other circuits become "0". References 249-1 to 249-n are AND circuits. Any output of the comparator 246-1, AND circuits 247-1 to 247-n, and the inverter 248-n becomes "1", so that any of the AND circuits 249-1 to 249-n outputs the content of registers 245-1 to 245-n and the other AND circuits output "0". Reference 250 is an OR circuit which outputs any output of the content of the registers 245-1 to 245-n.

Although the description of the embodiments of the present invention has been made with regard to its use for image verification of seals and printed characters on documents, the present invention can also be used in a warehouse or the like for stock selection by reading characters printed on a package or on a label attached to a package.

We claim:

1. An image processing system for detecting and correcting distortion of an input image comprising:
   image memories (231, 232) for storing digitized images before, during and after correction:
   a control circuit means (230) for controlling read and write operations to and from said image memories, setting parameters to a next circuit, activating said next circuit and calculating threshold values;

a density gradient detection circuit means (90) for reading contents of said image memories, calculating a sum of a ensity gradient in one image and numbers of picture elements n which the density gradient is not value "0", and sending alculated data to said control circuit means through a signal line c;

a density histogram extraction circuit means (91) for reading contents of said image memories, obtaining a density histogram from a total number of picture elements at every density value, and sending said density histogram to said control circuit means through the signal line c;

a density gradation reduction circuit means (233) for receiving the threshold values (THv, THp) corresponding to peaks and dips of the density histogram obtained by said density histogram extraction circuit means, arranging the density distribution input through as signal line 3, and sending the arranged image to said control circuit means through a signal line e;

a density gradation extension circuit means (234) for receiving the threshold value as a parameter for extension and the density value after extension, and sending the image once extended from the density level of the image input from a signal line d;

a maximum density detection circuit means (94) for reading the contents of the image memories, calculating the coordinate (Gn) and the coordinate value (Xn, Yn) of the maximum density at each area of the square area for obtaining the density slope, and sending the calculated coordinate value to said control circuit means;

a density slope correction circuit means (235) for receiving the density slope to be corrected from said control circuit means, and sending the image corrected by the density slope of the image through the signal line e; and a density gradation normalization circuit means (236) for receiving the threshold value of the density and the data of the density gradation normalization from said control circuit means, extending the density level, receiving the image corrected by the density slope, and sending the image returned to the previous density level through the signal line e.

2. An image processing system as claimed in claim 1, wherein said density gradient detection circuit means comprises:

a plurality of one clock delay circuits (119 to 127) each for outputting the density value of an optional 3×3 small area on the image;

line buffers (182, 129) for one line and connected to said delay circuits;

absolute value calculation circuits (130, 131) for calculating the density gradient based on the absolute value of the difference value between the density values of the adjacent images;

comparison circuits (132, 133, 135) for checking whether the absolute value is "0" or "1", and outputting the value "1" when the absolute value is "0";

a selection circuit (136) for selecting the output of said comparison circuit;

and AND circuit (137) for outputting the data when the output between said selection circuit and the NOR circuit (134) correspond;

a register (169) for storing a sum of the density gradient;

an adder circuit (168) for adding the output of a selection (167) to the output of said register; and a counter (171) for counting a number of picture elements not having a density gradient of "0".

3. An image processing system as claimed in claim 1, wherein said denisty histogram extraction circuit means comprises:

a one clock delay circuit (182) for storing an input picture element;

a plurality of comparison circuit (183-1 to 183-$n$) each for comparing the density of the input image obtained by said delay circuit with the extent (0 to n) of the density value of the input image, and outputting "1" when both data are equal; and counters (186-1 to 186-$n$) for adding a count of "1" at every output of "1" from each comparison circuit.

4. An image processing system as claimed in claim 1, wherein said density gradation reduction circuit means comprises:

a one clock delay circuit (237) for receiving the input image;

registers (238, 239) for storing the threshold values (THv, THp) of the reduction of each density level;

a comparison circuit (240) for comparing the output of said delay circuit with the threshold value (THv) stored in said register (238);

a selection circuit (241) for outputting the threshold value (THv) when the output of said delay circuit is smaller than the value (THv) and outputting the output of said delay circuit when the output of said delay circuit is larger than the value (THv);

a comparison circuit (242) for comparing the output of said delay circuit with the threshold value (THp) stored in said register (239); and a selection circuit (243) for outputting the threshold value (THp) when the output of said delay circuit is larger than the value (THp) and outputting the output of said delay circuit when the output of said delay circuit is smaller than the value (THp).

5. An image processing system as claimed in claim 1, wherein said density gradation extension circuit means comprises:

a plurality of one clock delay circuits (244 to 252) each for receiving the input image, and outputting the density value of the image at an optional 3×3 small area in the input images;

one-line buffers (253, 254) connected to said delay circuit;

a register (255) for storing the threshold value of the extension toward a low density when extending the density gradation;

comparison circuits (256 to 263) for comparing the density values of the peripheral eight picture elements at said small area with the threshold value stored in the register (255);

adder circuits (264 to 270) for outputting a number of picture elements having a density value smaller than the threshold value stored in said register (255) from the peripheral eight picture elements;

a register (271) for storing the threshold value "7" of a number of picture elements for an extension;

a register (272) for storing the density value used for the extension toward a low density when extending the density value;

a comparison circuit (273) for comparing the threshold value of said register (271) with the output of said adder circuit (270);

a selection circuit (274) for outputting the output of said register (272) when the output of said adder circuit (270) is larger than the threshold value "7", and outputting the density value of the picture element at the central portion of said small area when the output of said adder circuit is smaller than the threshold value "7";

a register (275) for storing the threshold value of the extension toward a high density when extending the density gradation;

comparison circuits (276 to 283) for comparing the threshold value stored in said register (275) in the peripheral eight picture elements, and outputting the value "1" when the density value is larger than the threshold value and outputting the value "0" when the density value is smaller than the threshold value;

an adder circuit (284 to 290) for outputting the number of picture elements having a value higher than the threshold value stored in said register (275) in the peripheral eight picture elements; and a selection circuit (293) for outputting the output value of said register (291) when the output of said adder circuit (290) is larger than the threshold value "7" and outputting the output value of said selection circuit (274) when the output of said adder circuit is smaller than the threshold value "7".

6. An image processing system as claimed in claim 1, wherein said maximum density detection circuit means comprises:

a counter (58) for counting up in synchronization with one picture element of the input image;

registers (59 to 62) for storing the maximum and minimum values at each X-Y coordinate;

comparison circuits (63 to 66) for comparing the output value of said register with the output value of said counter;

a selection circuit (68) for selecting the output of said comparison circuit obtained through said AND circuit (67) and the density value of the input image at that time; and a comparison circuit (69) for comparing the output of said selection circuit with the output of registers (70 to 72).

7. An image processing circuit as claimed in claim 1, wherein said density slope correction circuit means comprises:

a one clock delay circuit (297) for outputting the density value of one picture element at the input image;

a counter (285) for counting up in synchronization with an input of the density value to said delay circuit;

registers (296, 297) for storing the density slope (Sx, Sy) calculated by said control circuit (230) based on the parameter detected by said maximum density detection circuit;

multiplication circuits (298, 299) for calculating the density slope to be corrected; and adder circuits (300, 301) for adding the density slope to be corrected to the density value of the original image.

8. An image processing system as claimed in claim 1, wherein said density gradation normalization circuit comprises:

a one clock delay circuit (244) for outputting the density value of the picture element of the input image;

registers (244-1 to 244-$n$) for storing the threshold value (THx);

registers (245-1 to 245-$n$) for storing the density value of the original image form a high density;

comparison circuits (246-1 to 246-$n$) for comparing the contents of the register storing the threshold value with the density value of the input image, and outputting the value "1" when the density value of the input image is larger than the threshold value and outputting the value "0" when the density value of the input image is smaller than the threshold value;

inversion circuit (248-1 to 248-$n$) for inverting the output of said comparison circuit;

AND circuits (249-1 to 249-$n$) for obtaining an AND logic between the outputs of said AND circuits and the outputs of said register; and an OR cirucit (250) for obtaining an OR logic of the outputs of said AND circuit (249-1 to 249-$n$).

* * * * *